US012795035B2

(12) United States Patent
Nambara et al.

(10) Patent No.: US 12,795,035 B2
(45) Date of Patent: Nov. 10, 2026

(54) IMAGE READING APPARATUS, IMAGE FORMING APPARATUS, AND IMAGE READING METHOD FOR ADJUSTING GRAY BALANCE COEFFICIENTS AFTER REPLACEMENT OF A PART OF THE IMAGE READING APPARATUS OR THE IMAGE FORMING APPARATUS

(71) Applicants: Kohsuke Nambara, Kanagawa (JP); Hideki Hashimoto, Tokyo (JP); Tatsuya Ozaki, Kanagawa (JP)

(72) Inventors: Kohsuke Nambara, Kanagawa (JP); Hideki Hashimoto, Tokyo (JP); Tatsuya Ozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 318 days.

(21) Appl. No.: 18/433,471

(22) Filed: Feb. 6, 2024

(65) Prior Publication Data

US 2024/0275902 A1 Aug. 15, 2024

(30) Foreign Application Priority Data

Feb. 10, 2023 (JP) ................................. 2023-019239

(51) Int. Cl.
*H04N 1/401* (2006.01)
*H04N 1/00* (2006.01)
*H04N 1/407* (2006.01)

(52) U.S. Cl.
CPC ......... *H04N 1/401* (2013.01); *H04N 1/00013* (2013.01); *H04N 1/00087* (2013.01); *H04N 1/00819* (2013.01); *H04N 1/4076* (2013.01)

(58) Field of Classification Search
CPC .. H04N 1/401; H04N 1/0013; H04N 1/00087; H04N 1/00819; H04N 1/4076
See application file for complete search history.

(56) References Cited

U.S. PATENT DOCUMENTS

2002/0196476 A1 12/2002 Ozaki
2011/0051201 A1 3/2011 Hashimoto et al.
2012/0113479 A1* 5/2012 Sakai ..................... H04N 1/401 358/447
2013/0163018 A1* 6/2013 Yoshigae ........... H04N 1/00037 358/1.13
2013/0222858 A1* 8/2013 Yokoyama ......... G03G 15/5062 358/2.1

(Continued)

FOREIGN PATENT DOCUMENTS

JP 2010-220076 A 9/2010

*Primary Examiner* — Nicholas Pachol
(74) *Attorney, Agent, or Firm* — XSENSUS LLP

(57) ABSTRACT

An image reading apparatus incudes a white reference plate, a reading unit to read the white reference plate; and circuitry to: cause the reading unit to read the white reference plate under a first reading condition before shipment of the image reading apparatus to obtain a first reading value, cause the reading unit to read the white reference plate under a second reading condition same with the first reading condition after replacement of a part of the image reading apparatus after the shipment to obtain a second reading value, and adjust a gray balance coefficient based on the first reading value and the second reading value.

14 Claims, 19 Drawing Sheets

(56) References Cited

U.S. PATENT DOCUMENTS

2013/0286306 A1* 10/2013 Eiyama .................... B41J 29/38 349/19
2014/0204432 A1 7/2014 Hashimoto et al.
2014/0293364 A1* 10/2014 Kawai ................ H04N 1/00819 358/406
2016/0003673 A1 1/2016 Hashimoto et al.
2016/0173719 A1 6/2016 Hashimoto et al.
2016/0219163 A1 7/2016 Shirado et al.
2016/0373604 A1 12/2016 Hashimoto et al.
2017/0019547 A1 1/2017 Ozaki
2017/0201700 A1 7/2017 Hashimoto et al.
2017/0244853 A1 8/2017 Yabuuchi et al.
2017/0295298 A1 10/2017 Ozaki et al.
2017/0302821 A1 10/2017 Sasa et al.
2018/0084146 A1* 3/2018 Mikami ................. H04N 1/401
2018/0139345 A1 5/2018 Goh et al.
2019/0238717 A1 8/2019 Inage et al.
2019/0289163 A1 9/2019 Hashimoto et al.
2019/0327387 A1 10/2019 Hashimoto et al.
2019/0335061 A1 10/2019 Nakazawa et al.
2019/0387131 A1 12/2019 Komatsu et al.
2020/0120224 A1 4/2020 Sasa et al.
2020/0120225 A1 4/2020 Oyama et al.
2020/0120228 A1 4/2020 Ozaki et al.
2020/0137262 A1 4/2020 Kubo et al.
2020/0244837 A1 7/2020 Tsukahara et al.
2020/0252513 A1 8/2020 Nakada et al.
2020/0296255 A1 9/2020 Hashimoto et al.
2020/0336615 A1 10/2020 Ono et al.
2021/0014441 A1 1/2021 Ohmiya et al.
2021/0099614 A1 4/2021 Ozaki et al.
2021/0218860 A1 7/2021 Nikaku et al.
2021/0227087 A1 7/2021 Ozaki et al.
2021/0385384 A1 12/2021 Ohmiya et al.
2022/0086307 A1 3/2022 Ono et al.
2022/0109776 A1 4/2022 Ishii et al.
2022/0109778 A1 4/2022 Nambara et al.
2022/0109779 A1 4/2022 Hashimoto et al.
2022/0303417 A1 9/2022 Hashimoto et al.
2023/0283726 A1 9/2023 Nambara et al.

* cited by examiner

COMPARATIVE EXAMPLE

IMAGE READING APPARATUS, IMAGE FORMING APPARATUS, AND IMAGE READING METHOD FOR ADJUSTING GRAY BALANCE COEFFICIENTS AFTER REPLACEMENT OF A PART OF THE IMAGE READING APPARATUS OR THE IMAGE FORMING APPARATUS

CROSS-REFERENCE TO RELATED APPLICATION

This patent application is based on and claims priority pursuant to 35 U.S.C. § 119(a) to Japanese Patent Application No. 2023-019239, filed on Feb. 10, 2023, in the Japan Patent Office, the entire disclosure of which is hereby incorporated by reference herein.

BACKGROUND

Technical Field

The present disclosure relates to an optical scanner, an object detector, and a sensing apparatus.

Related Art

When the same original document is read by an image reading apparatus, output differences occur among image reading apparatuses due to variations in the spectral characteristics of the light sources and the reading sensors. The output differences can be eliminated by using the gray balance coefficients corresponding to the colors of red, green, and blue (RGB) at the time of shading compensation. The gray balance coefficients are coefficients for reading a reference chart, for example, in a production process before shipment and compensating the reading values at this time to be the corresponding target values. Since the gray balance coefficient is a value set depending on the variations among the image reading apparatuses, the gray balance coefficient is adjusted to an appropriate state when a part of the image reading unit such as a light source, a lens block, a sensor, or a white reference plate is replaced after shipment. Since the reference chart is required for the adjustment or the adjustment operations take time, some technologies on a gray balance adjustment to simplify these adjustment operations are known.

A technology to adjust such a gray balance coefficient is disclosed. In the technology, a second reference plate is disposed separately from a white reference plate, a reading value of the second reference plate is stored in a data storing unit before shipment, and the gray balance coefficient is adjusted based on a present reading value of the second reference plate and the reading value stored in the data storing unit.

SUMMARY

According to an embodiment of the present disclosure, an image reading apparatus incudes a white reference plate, a reading unit to read the white reference plate; and circuitry to: cause the reading unit to read the white reference plate under a first reading condition before shipment of the image reading apparatus to obtain a first reading value, cause the reading unit to read the white reference plate under a second reading condition same with the first reading condition after replacement of a part of the image reading apparatus after the shipment to obtain a second reading value, and adjust a gray balance coefficient based on the first reading value and the second reading value.

According to an embodiment of the present disclosure, an image forming apparatus includes: the image reading apparatus; and an image forming unit to form an image based on the third reading value on which a shading compensation is performed by the circuitry.

According to an embodiment of the present disclosure, an image reading method includes reading a white reference plate by a reading unit; and adjusting a gray balance coefficient based on a first reading value of the white reference plate obtained by the reading unit under a first reading condition and a second reading value of the white reference plate obtained by the reading unit under a second reading condition same with the first reading condition.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
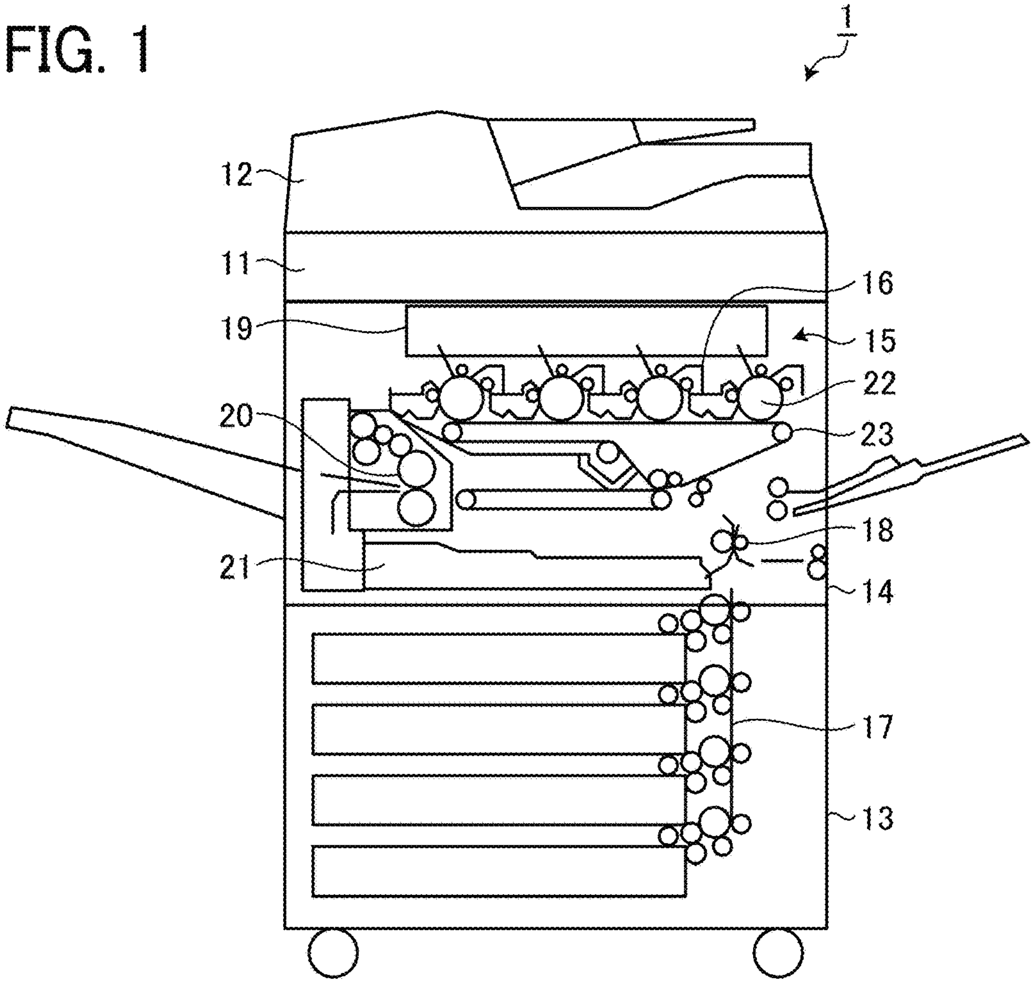
FIG. 1 is a diagram illustrating an overall configuration of an image forming apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to one aspect of the present disclosure, an image reading apparatus, an image forming apparatus, and an image reading method does not include a reference plate other than a white reference plate and can adjust a gray balance coefficient with high accuracy.

In the following description, an image reading apparatus, an image forming apparatus, and an image reading method according to embodiments of the present disclosure will be described in detail with reference to the drawings. Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Figure 20:
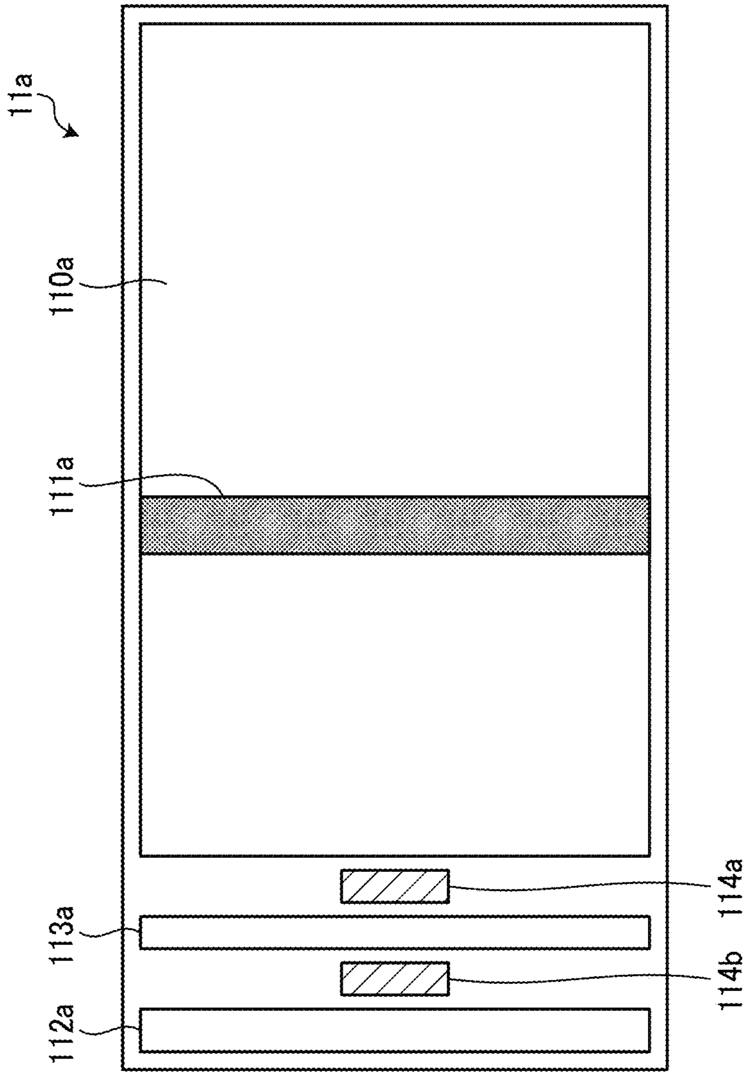
FIG. 20 is a schematic diagram illustrating a configuration of a typical scanner.

FIG. 20 is a schematic diagram illustrating a configuration of a typical scanner. Referring to FIG. 20, the configuration and operation of a typical scanner will be described.

The typical scanner 11*a* illustrated in FIG. 20 includes, for example, a contact glass 110*a*, a carriage 111*a*, a document feeder (DF) glass 112*a*, a white reference plate 113*a*, and second reference plates 114*a* and 114*b*.

The contact glass 110*a* is a glass part for placing an original document and reading the original document by scanning the original document with the carriage 111*a*. In the following description, the process of placing an original document on the contact glass 110*a* and reading the document by scanning the original document with the carriage 111*a* may be referred to as pressure plate reading. The carriage 111*a* is a part that reads the original document while moving in the left and right direction as viewed from the drawing of FIG. 20. The DF glass 112*a* is a glass part for automatically reading the original document by moving the carriage 111*a* directly below the DF glass 112*a* when the original document is automatically conveyed by using an auto document feeder (ADF). In the following description, the process of the automatically conveying the original document by the ADF and reading the original document by the carriage 111*a* through the DF glass 112*a* may be referred to as sheet-through reading.

The white reference plate 113*a* is a reference plate for obtaining a reading value thereof, and the reading value is used for calculating and adjusting the gray balance coefficient. The second reference plate 114*a* is a reference plate disposed separately from the white reference plate 113*a* for adjusting the gray balance coefficient using the reading value at the time of the pressure plate reading. The second reference plate 114*b* is a reference plate disposed separately from the white reference plate 113*a* for adjusting the gray balance coefficient using the reading value at the time of the sheet-through reading. As illustrated in FIG. 20, the second reference plates 114*a* and 114*b* are disposed so that the white reference plate 113*a* is sandwiched between the second reference plates 114*a* a and 114*b* in the scanning direction of the carriage 111*a*. Since the second reference plate 114*a* and the second reference plate 114*b* have the same function in the pressure plate reading and the sheet-through reading, the second reference plate 114*a* will be described as an example.

In the typical scanner 11*a*, in a production process before shipment, the carriage 111*a* reads a predetermined reference chart to obtain a reading value Dx, a gray balance coefficient Xref is calculated by an equation similar to the second equation described later so that the reading value Dx becomes a preset target value $D_{target\_x}$, and the gray balance coefficient Xref is stored in a storing unit. In a state of calculating the gray balance coefficient Xref, the carriage 111*a* is moved to a position directly below the second reference plate 114*a*, the second reference plate 114*a* is read, and the reading value is stored in the storing unit as the reference value $G_{target\_x}$ of the second reference plate 114*a*. After the apparatus including the typical scanner 11*a* is shipped, when the original document is read, the shading compensation is applied to the reading value by an equation similar to the third equation described later using the calculated gray balance coefficient.

When the part of the typical scanner 11*a* such as the light source, the lens block, the sensor, or the white reference plate 113*a* are replaced after the shipment, the gray balance coefficient Xref needs to be adjusted so that the reading value of the second reference plate 114*a* becomes the reference value $G_{target\_x}$ stored in the storing unit described above. In this case, the carriage 111*a* moves a position directly below the white reference plate 113*a* and reads the white reference plate 113*a* to obtain a white reference plate reading value Wx. Then, the carriage 111*a* is moved to a position directly below the second reference plate 114*a* to read the second reference plate 114*a* and a reading value Dx is obtained. Then, the reading value Dx is compensated with a shading compensation by an equation similar to the third equation described later using the white-reference-plate reading value Wx, and the reading value after the shading compensation is set to the reading value Gx. Then, the gray balance coefficient Xref is adjusted by the first equation below using the reading value Gx after the shading compensation and the reference value $G_{target\_x}$ stored in the storing unit before shipment, and the gray balance coefficient Xref_rev after the adjustment is obtained.

$$\text{Xref\_rev} = Xref \times \frac{G_{target\_x}}{Gx} \quad \text{First Equation}$$

Then, using the gray balance coefficient Xref_rev after adjustment, the reading value obtained by reading the original document is compensated with shading compensation by an equation similar to the fifth equation described later. As described above, when the part of the typical scanner 11*a* such as the light source, the lens block, the sensor, or the white reference plate 113*a* is replaced after shipment, the reading value is compensated so that the reading value becomes the target value.

In the typical scanner 11*a* according to the related art described above, when the part of the typical scanner 11*a* such as the light source, the lens block, the sensor, or the white reference plate 113*a* is replaced after shipment, the gray balance coefficient can be automatically adjusted without the reference chart. However, since the second reference plates 114*a* and 114*b* for adjusting the gray balance coefficient needs to be disposed separately from the white reference plate, the cost and the number of steps for installing the second reference plates are increased. As a result, the size of the apparatus is increased by adding the second reference plate. When the second reference plates 114*a* and 114*b* are disposed in the immediate vicinity of the white reference plate 113*a*, the second reference plates 114*a* and 114*b* cannot be correctly read due to the influence of the flare from the white reference plate 113*a* to the second reference plates 114*a* and 114*b*, and the adjustment abnormality of the gray balance coefficient may occur. The second reference plates 114*a* and 114*b* are used for adjusting the gray balance coefficient. However, a difference between the reading conditions of the reading values of the second reference plates 114*a* and 114*b* before shipment stored in the storing unit and the reading conditions of the reading values of the second reference plates 114*a* and 114*b* after adjusting the gray balance at the present time occurs. As a result, a variation of the adjusted gray balance coefficient is generated because of the difference.

In the present embodiment, a configuration and an operation for solving the above-described problem in the related art will be described.

First Embodiment Overall Structure of Image Forming Apparatus FIG. 1 is a diagram illustrating an overall configuration of an image forming apparatus 1 according to a first embodiment of the present disclosure. Referring to FIG. 1, the overall configuration of the image forming apparatus 1 according to an embodiment of the present disclosure will be described.

The image forming apparatus 1 illustrated in FIG. 1 is a multifunction peripheral (MFP) including at least a copying function, a printing function, and a scanning function. As illustrated in FIG. 1, the image forming apparatus 1 includes a scanner 11, an automatic document feeder (ADF) 12, a sheet feeder 13, and a main body 14.

The scanner 11 is a device that reads an original document placed on a contact glass or an original document automatically conveyed by the automatic document feeder 12. The configuration of the scanner 11 will be described in detail in FIG. 2 later.

The automatic document feeder 12 is a device for automatically conveying the original document to the reading surface of the scanner 11.

The sheet feeder 13 includes multiple paper feed trays that store sheets of paper, and a conveying path 17. The conveying path 17 is a conveyance path that takes out a sheet from one of the multiple paper feed trays and conveys the sheet to a resist roller 18 described later.

The main body 14 includes an image forming unit 15, a resist roller 18, an optical writing device 19, a fixing and conveying unit 20, a double-sided tray 21, and an intermediate transfer belt 23.

The image forming unit 15 is a tandem image forming unit including four photoconductive drums 22 arranged in parallel corresponding to four colors of yellow (Y), magenta (M), cyan (C), and black (K) (YMCK). A charger, a developing unit 16 that forms an image on the surface of the photoconductive drum 22, a transfer device, a cleaner, and a discharger are disposed around each of the photoconductive drums 22.

The resist roller 18 is a roller that supplies the paper conveyed from the sheet feeder 13 through the conveying path 17.

The optical writing device 19 is a device that performs optical writing on the photoconductive drum 22 corresponding to each color of YMCK.

The fixing and conveying unit 20 is a device that fixes and discharges the paper on which the full-color image has been secondarily transferred from the intermediate transfer belt 23.

The double-sided tray 21 is a tray for reversing the sheet on which the secondary transfer has been performed.

The intermediate transfer belt 23 is a transfer belt stretched between a driving roller and a driven roller in a state of being held in a nip between the transfer device and the photoconductive drum 22. The intermediate transfer belt 23 secondarily transfers the images primarily transferred from the corresponding photoconductive drums 22 in the order of, for example, Y, M, C, and K, and the primarily transferred full-color image in which four colors are superimposed to the sheet.

Figure 2:
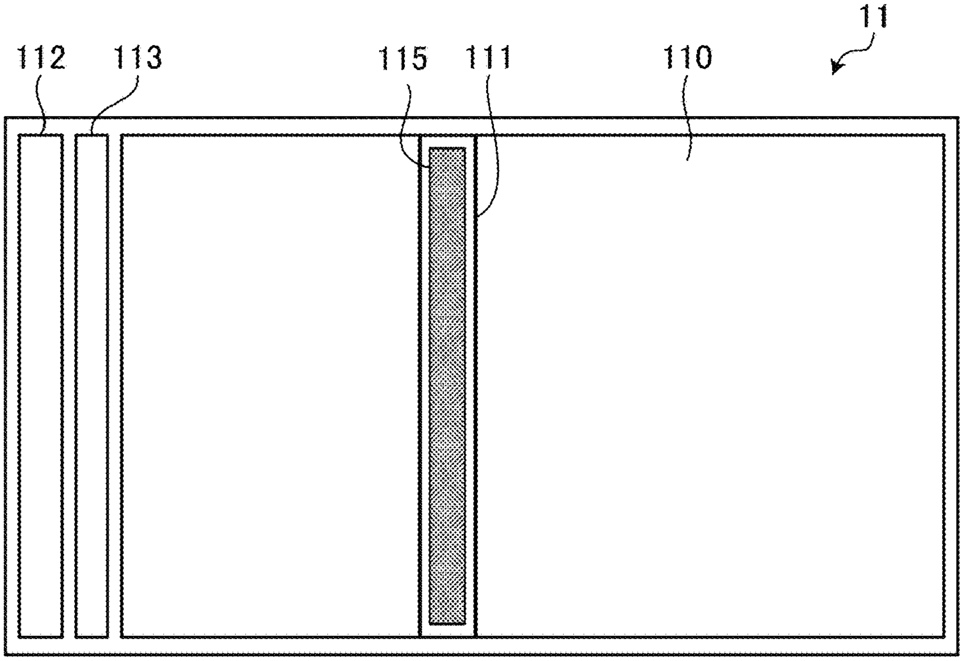
FIG. 2 is a schematic diagram illustrating a configuration of a scanner of the image forming apparatus of FIG. 1 according to the first embodiment of the present disclosure.

Overall Configuration of Image Forming Apparatus FIG. 2 is a schematic diagram illustrating a configuration of a scanner of the image forming apparatus according to the first embodiment of the present disclosure. Referring to FIG. 2, a schematic configuration of the scanner 11 of the image forming apparatus 1 according to an embodiment of the present disclosure will be described.

As illustrated in FIG. 2, the scanner 11 includes a carriage 111, a DF glass 112, and a white reference plate 113.

The contact glass 110 is a glass part for placing an original document and reading the original document by scanning the original document with the carriage 111.

The carriage 111 is a part that reads the original document while moving in the left and right direction as viewed from the drawing of FIG. 2. The scanner 11 includes a light source to emit an illumination light beam to an original document. The illumination light beam is reflected from the original document as a reflected light beam. The carriage 111 reads the original document by detecting the reflected light beam using a sensor 115 such as a contact image sensor (CIS) or a charge-coupled device (CCD).

The DF glass 112 is a glass part for automatically reading an original document by moving the carriage 111 directly below the DF glass 112 when the original document is automatically conveyed by using an automatic document feeder 12.

The white reference plate 113 is disposed between the DF glass 112 and the contact glass 110, and is a reference plate for using a reading value by the carriage 111 for calculation and adjustment of the gray balance coefficient.

As described above, the scanner 11 is different from the typical scanner 11*a* in FIG. 20 described above. The scanner 11 does not include the reference plates corresponding to the second reference plates 114*a* and 114*b* that sandwich the white reference plate 113 therebetween.

Hardware Configuration of Image Forming Apparatus

Figure 3:
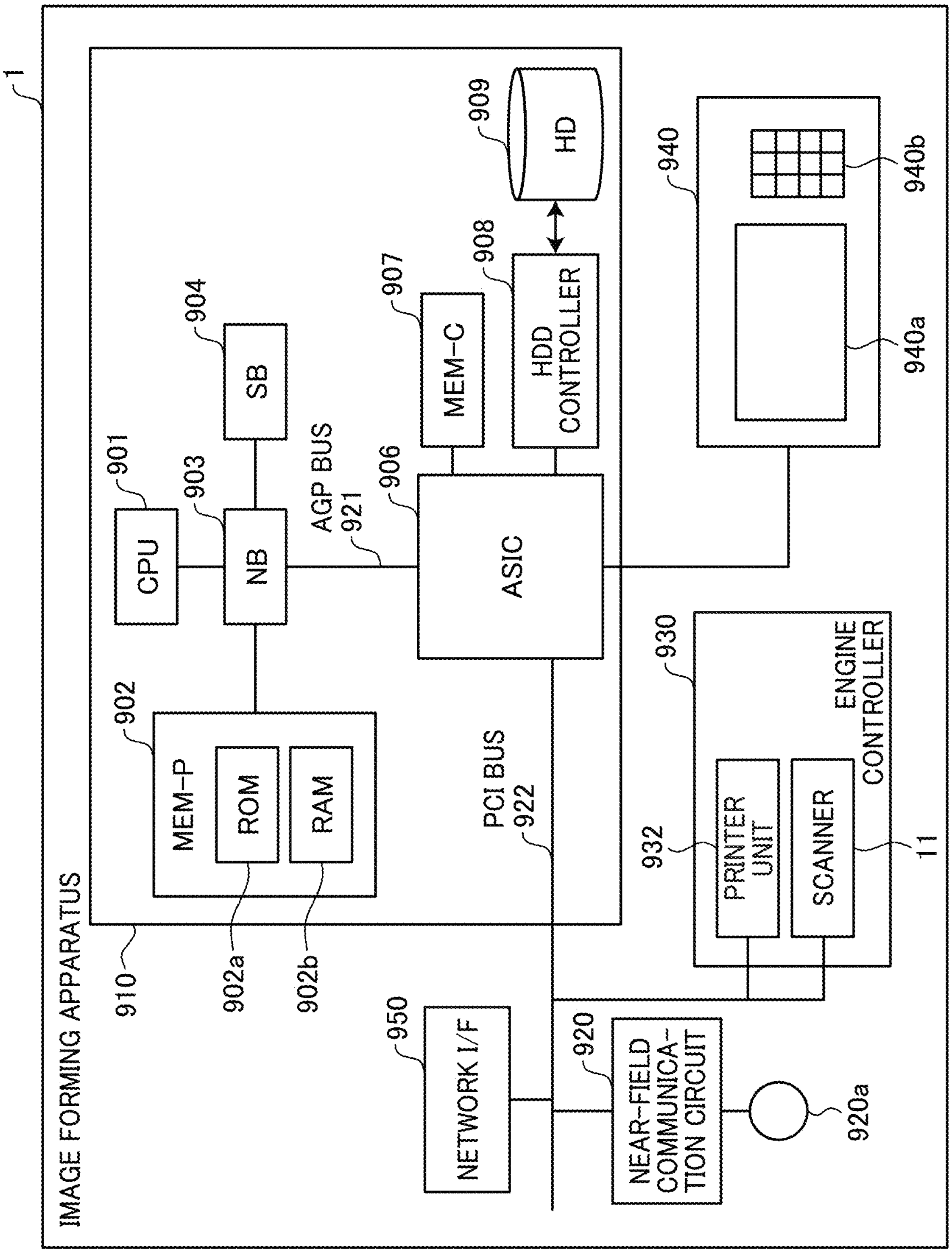
FIG. 3 is a diagram illustrating a hardware configuration of the image forming apparatus of FIG. 1 according to the first embodiment of the present disclosure.

FIG. 3 is a diagram illustrating a hardware configuration of the image forming apparatus according to the first embodiment of the present disclosure. Referring to FIG. 3, the hardware configuration of the image forming apparatus 1 according to an embodiment of the present disclosure will be described.

As illustrated in FIG. 3, the image forming apparatus 1 includes a controller 910, a near-field communication circuit 920, an engine controller 930, an operation panel 940 (serving as an operation unit), and a network I/F 950.

The controller 910 includes a central processing unit (CPU) 901, which is a main part of the computer, a system memory (MEM-P) 902, a north bridge (NB) 903, a south bridge (SB) 904, an application-specific integrated circuit (ASIC) 906, a local memory (MEM-C) 907, a hard disk drive (HDD) controller 908, and a hard drive (HD) 909. The NB 903 and the ASIC 906 are connected to each other via an accelerated graphics port (AGP) bus 921.

The CPU 901 is a computing device that performs overall control of the image forming apparatus 1. The NB 903 is a bridge for connecting the CPU 901, the MEM-P 902, the SB 904, and the AGP bus 921, and includes a memory controller for controlling reading and writing from and to the MEM-P 902, a peripheral component interconnect (PCI) master, and an AGP target.

The MEM-P 902 includes a read-only memory (ROM) 902*a* as a memory for storing programs and data for performing each function of the controller 910, and a random-access memory (RAM) 902*b* to be used for a memory for developing the programs and data and for drawing at the time of memory printing. The program stored in the RAM 902*b* may be provided by recording the program in a file in an installable or executable format on a computer-readable recording medium such as a compact disc-read-only memory (CD-ROM), a compact disc-recordable (CD-R), or a digital versatile disk (DVD).

The SB 904 is a bridge for connecting the NB 903 to the PCI device and the peripheral devices. The ASIC 906 is an integrated circuit (IC) for image processing having hardware elements for image processing, and serves as a bridge for connecting the AGP bus 921, the PCI bus 922, the HDD controller 908, and the MEM-C 907 to each other. The ASIC 906 includes a PCI target and an AGP master, an arbiter (ARB) that forms the core of the ASIC 906, a memory controller that controls the MEM-C 907, multiple direct memory access controllers (DMAC) that rotate image data by hardware logic, and a PCI unit that transfers data between the scanner 11 and the printer unit 932 via the PCI bus 922. The ASIC 906 may be connected to a universal serial bus (USB) interface or an institute of electrical and electronics engineers (IEEE) 1394 interface.

The MEM-C 907 is a local memory used as a copy image buffer and a code buffer. The HD 909 is a storage for storing image data, font data used in printing, and forms. The HDD controller 908 is a controller that controls reading or writing data from or to the HD 909 based on the control of the CPU 901. The HDD controller 908 and the HD 909 may be a solid-state drive (SSD).

The AGP bus 921 is a bus interface for graphics accelerator cards that has been proposed to speed up graphics processing, and allows the graphics accelerator cards to be faster by directly accessing the MEM-P 902 at high throughput.

The near-field communication circuit 920 is a communication circuit such as near-field communication (NFC) or Bluetooth (registered trademark). The near-field communication circuit 920 is electrically connected to the ASIC 906 via the PCI bus 922. The near-field communication circuit 920 is connected to an antenna 920*a* for wireless communication.

The engine controller 930 includes a scanner 11 and a printer unit 932 (image forming unit). The scanner 11 and the printer unit 932 include an image processing function such as error diffusion or gamma conversion.

The operation panel 940 includes a panel display 940*a* such as a touch panel that displays a current setting value or a selection screen and receives input from a user, and a hard key 940*b* including a numeric key to receive a setting value of a condition related to image formation such as a density setting condition and a start key for receiving a copy start instruction.

The image forming apparatus 1 can sequentially switch and select the document box function, the copy function, the printer function, and the fax function by the switch key of the operation panel 940 to switch applications. When the document box function is selected, the document box mode is selected, when the copy function is selected, the copy mode is selected, when the printer function is selected, the printer mode is selected, and when the fax function is selected, the fax mode is selected.

The network I/F 950 is an interface for data communication via a network, and is an interface that allows communication based on, for example, Ethernet (registered trademark), and transmission control protocol/internet protocol (TCP/IP). The network I/F 950 is electrically connected to the ASIC 906 via the PCI bus 922.

The hardware configuration of the information processing apparatus that constitutes the image forming apparatus 1 illustrated in FIG. 3 is one embodiment of the present disclosure, and may not include all the components illustrated in FIG. 3, or include other components.

Figure 4:
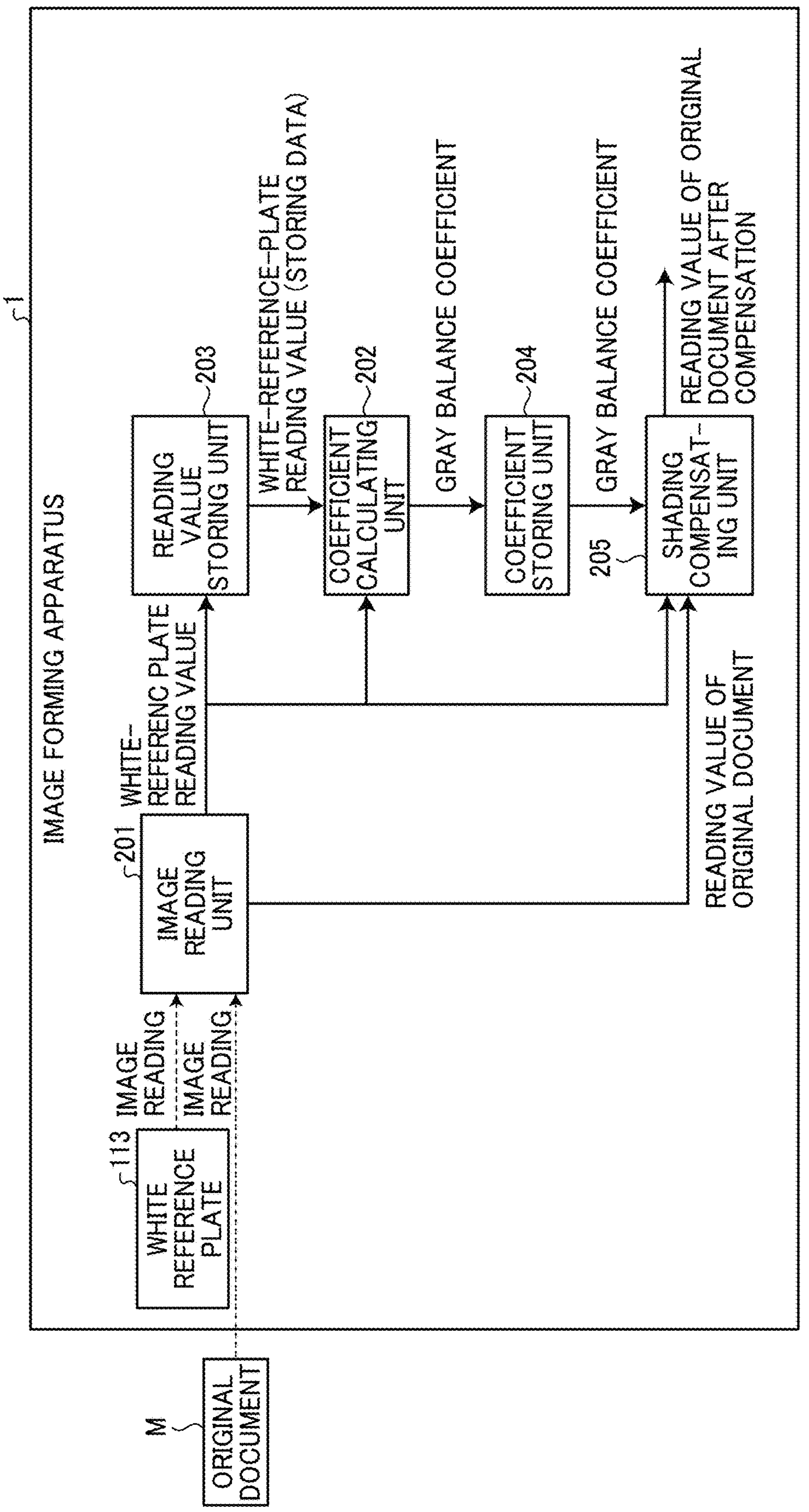
FIG. 4 is a diagram illustrating a configuration of a functional block of the image forming apparatus of FIG. 1 according to the first embodiment of the present disclosure.

Configuration and Operation of Functional Blocks of Image Forming Apparatus FIG. 4 is a diagram illustrating a configuration of a functional block of the image forming apparatus according to the first embodiment of the present disclosure. Referring to FIG. 4, the functional block and operation of the image forming apparatus 1 according to an embodiment of the present disclosure will be described.

As illustrated in FIG. 4, the image forming apparatus 1 includes an image reading unit 201 (reading unit), a coefficient calculating unit 202 (coefficient adjusting unit), a reading value storing unit 203 (storing unit), a coefficient storing unit 204, and a shading compensating unit 205 (correcting unit).

The image reading unit 201 is a functional unit that turns on a light source and reads the original document M and the white reference plate 113. The reading value of the original document M read by the image reading unit 201 may be referred to as a document reading value, and the reading value of the white reference plate 113 may be referred to as a white-reference-plate reading value. The image reading unit 201 outputs the document reading value read from the original document M to the shading compensating unit 205, and outputs the white-reference-plate reading value read from the white reference plate 113 to the coefficient calculating unit 202 and the shading compensating unit 205. The image reading unit 201 stores the white-reference-plate reading value (first reading value) read from the white reference plate 113 in a production process before shipment (referred to as "before shipment" in the following description) in the reading value storing unit 203 as the reference value $W_{target\_x}$. In this case, the image reading unit 201 may calculate an average value of the white-reference-plate reading value with respect to the white reference plate 113 before shipment, and store the average value as the reference value $W_{target\_x}$ in the reading value storing unit 203. The image reading unit 201 is achieved by the scanner 11 illustrated in FIG. 3.

The coefficient calculating unit 202 is a functional unit that calculates the gray balance coefficient Xref using the reading value of the reference chart, the target value of each color, and the white-reference-plate reading value of the white reference plate 113 before shipment. The coefficient calculating unit 202 also adjusts the gray balance coefficient Xref using the reference value $W_{target\_x}$ stored in the reading value storing unit 203 and the white-reference-plate reading value Wx (second reading value) obtained by newly reading the white reference plate 113, and obtains the adjusted gray balance coefficient Xref_rev after a part of the typical scanner 11*a* such as a light source, a lens block, a sensor, or a white reference plate 113*a* is replaced after shipment (referred to as "after replacement of the part" in the following description). The coefficient calculating unit 202 is achieved by executing a program with, for example, the CPU 901 illustrated in FIG. 3.

As described above, the reading value storing unit 203 is a functional unit that stores the reference value $W_{target\_x}$ of the white reference plate 113 read by the image reading unit 201 before shipment. The reading value storing unit 203 is achieved by the HD 909 illustrated in FIG. 3.

The coefficient storing unit 204 is a functional unit that stores the gray balance coefficient Xref calculated by the coefficient calculating unit 202 and the gray balance coefficient Xref_rev adjusted by the coefficient calculating unit 202. The coefficient storing unit 204 is achieved by the HD 909 illustrated in FIG. 3.

The shading compensating unit 205 is a functional unit that applies a shading compensation to the reading value of the original document M read by the image reading unit 201 using the gray balance coefficient Xref (if there is the gray balance coefficient Xref_rev, the gray balance coefficient Xref_rev is used) stored in the coefficient storing unit 204. The shading compensating unit 205 is achieved by executing a program with, for example, the CPU 901 illustrated in FIG. 3.

At least a part of the functional units achieved by software (program) among the functional units of the image forming apparatus 1 illustrated in FIG. 4 may be achieved by a hardware circuit such as a field-programmable gate array (FPGA) or an ASIC.

The reference value $W_{target\_x}$ of the white reference plate 113 read by the image reading unit 201 before shipment is stored in the reading value storing unit 203. However, the storing unit that stores the reference value $W_{target\_x}$ is not limited to the reading value storing unit 203. The reference value $W_{target\_x}$ may be stored in an external device such as a cloud. When the image forming apparatus 1 uses the reference value $W_{target\_x}$, the reference value $W_{target\_x}$ may be received via the network I/F 950. Further, the gray balance coefficient Xref and the gray balance coefficient Xref_rev are stored in the coefficient storing unit 204. However, the storing unit that stores the gray balance coefficients is not limited to the coefficient storing unit 204. The gray balance coefficient Xref and the gray balance coefficient Xref_rev may be stored in an external device such as a cloud. When the image forming apparatus 1 uses the gray balance coefficient Xref and the gray balance coefficient Xref_rev, the gray balance coefficient Xref and the gray balance coefficient Xref_rev may be received via the network I/F 950.

The functional units of the image forming apparatus 1 illustrated in FIG. 4 conceptually indicate the functions, but the functional units are not limited to the configuration in FIG. 4. For example, multiple functional units illustrated as independent functional units in the image forming apparatus 1 illustrated in FIG. 4 may be configured as one functional unit. On the other hand, the functions of one functional unit in the image forming apparatus 1 illustrated in FIG. 4 may be divided into multiple functional units.

Figure 5:
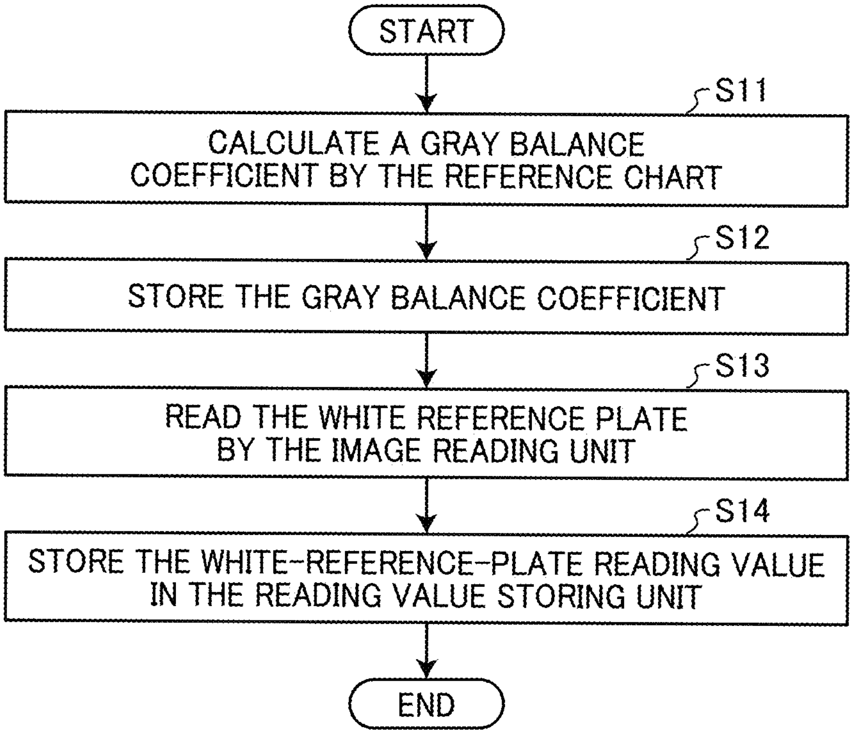
FIG. 5 is a flowchart of processing before shipment of the image forming apparatus of FIG. 1 according to the first embodiment of the present disclosure.

Processing of Image Forming Apparatus before Shipment FIG. 5 is a flowchart of processing of the image forming apparatus before shipment according to the first embodiment of the present disclosure. Referring to FIG. 5, processing of the image forming apparatus 1 before shipment according to the first embodiment of the present disclosure will be described.

In some embodiments, an image forming apparatus includes the image reading apparatus according to any one of the eleventh to eighteenth aspects and an image forming unit to form an image based on the third reading value on which a shading compensation is performed by the circuitry.

Step S11 The image reading unit 201 reads the reference chart and the white reference plate 113 and obtains a reading value Dx of the reference chart and a white-reference-plate reading value Wx of the white reference plate 113. The coefficient calculating unit 202 calculates the gray balance coefficient Xref by the second equation below.

$$Xref = \frac{255}{D_{target\_x}} \times \frac{Dx - Bx}{Wx - Bx} \quad \text{Second Equation}$$

In the second equation described above, $D_{target\_x}$ represents a target value of each color, and Bx represents a black offset value. Then, the process proceeds to step S12.

Step S12 The coefficient calculating unit 202 stores the calculated gray balance coefficient Xref in the coefficient storing unit 204. Then, the process proceeds to step S13.

Step S13 The image reading unit 201 reads the white reference plate 113 and obtains a white-reference-plate reading value. Then, the process proceeds to step S14.

Step S14 The image reading unit 201 stores the white-reference-plate reading value as the reference value $W_{target\_x}$ in the reading value storing unit 203. Then, the processing before shipment ends.

In the image forming apparatus 1 after shipment, the shading compensating unit 205 applies a shading compensation to the reading value Dx of the original document M read by the image reading unit 201 by the third equation below using the white-reference-plate reading value Wx newly read by the image reading unit 201 with respect to the white reference plate 113, and obtains the compensated reading value Dsh_x.

$$\text{Dsh\_x} = \frac{Dx - Bx}{Wx - Bx} \times \frac{255}{Xref} \qquad \text{Third Equation}$$

Figure 6:
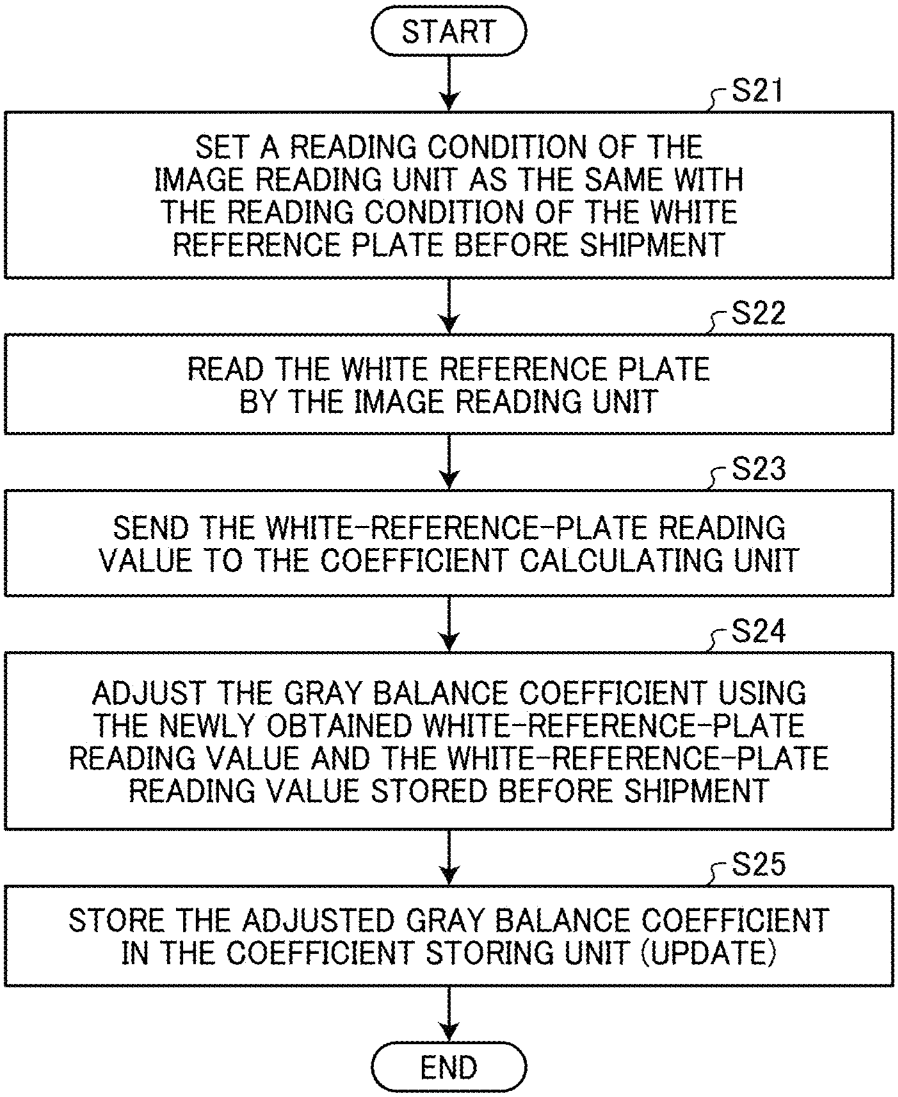
FIG. 6 is a flowchart of a processing flow of a gray balance coefficient adjustment of the image forming apparatus of FIG. 1 according to the first embodiment of the present disclosure.
Figure 7A:
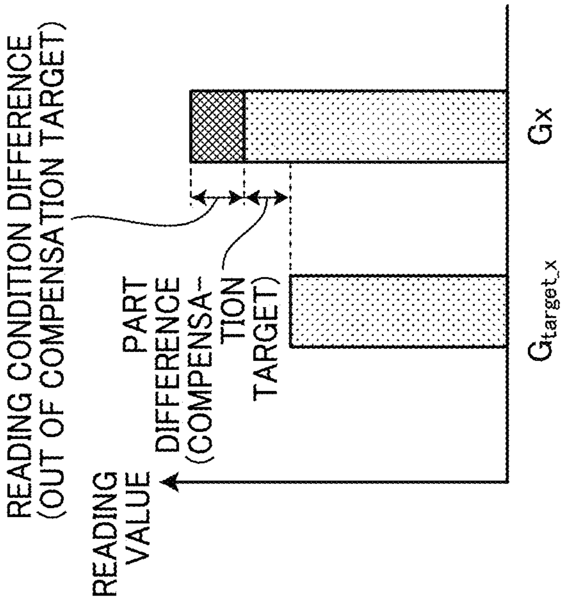
FIG. 7A is a diagram illustrating an effect achieved by the image forming apparatus of FIG. 1 without compensation, according to the first embodiment of the present disclosure.
Figure 7B:
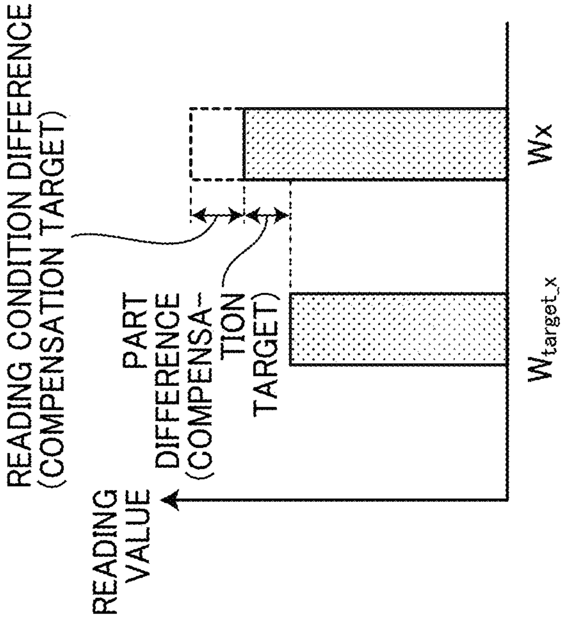
FIG. 7B is a diagram illustrating an effect of compensation in reading condition, in the image forming apparatus of FIG. 1 according to the first embodiment of the present disclosure.

Gray Balance Coefficient Adjustment Processing of Image Forming Apparatus FIG. 6 is a flowchart of the processing flow of the gray balance coefficient adjustment of the image forming apparatus according to the first embodiment of the present disclosure. FIGS. 7A and 7B are diagrams describing the effect of the image forming apparatus 1 according to the first embodiment. Referring to FIGS. 6, 7A, and 7B, a processing flow of the gray balance coefficient adjustment of the image forming apparatus 1 according to the present embodiment will be described.

Since the gray balance coefficient is a value to be adjusted according to the variation of the image forming apparatus 1 (scanner 11), the gray balance coefficient is required to adjust to an appropriate value after the replacement of the part after shipment. However, if the processing using the reference chart before shipment illustrated in FIG. 4 is performed after the shipment, the workload of the operator and the number of steps are increased. In the image forming apparatus 1 according to an embodiment of the present disclosure, the processing of the gray balance coefficient adjustment illustrated in FIG. 6 is performed to reduce the workload and the number of steps.

Step S21 After the replacement of the part, the reading condition of the reading operation by the image reading unit 201 is set to be the same as the reading condition at the time of reading the white reference plate 113 before shipment as illustrated in FIG. 5. The same reading condition may include a reading condition having a degree that can solve the adjustment difference of the gray balance coefficient in the related art other than precisely the same reading condition. Then, the process proceeds to step S22.

Step S22 The image reading unit 201 reads the white reference plate 113 to obtain a white-reference-plate reading value Wx of the white reference plate 113. Then, the process proceeds to step S23.

Step S23 The image reading unit 201 transmits (outputs) the white-reference-plate reading value Wx to the coefficient calculating unit 202. Then, the process proceeds to step S24.

Step S24 The coefficient calculating unit 202 adjusts the gray balance coefficient Xref by the fourth equation below using the white-reference-plate reading value Wx received from the image reading unit 201 and the reference value $W_{target\_x}$ stored in the reading value storing unit 203, and obtains the gray balance coefficient Xref_rev after adjustment.

$$\text{Xref\_rev} = Xref \times \frac{W_{target\_x}}{Wx} \qquad \text{Fourth Equation}$$

Then, the process proceeds to step S25.

Step S25 The coefficient calculating unit 202 stores the gray balance coefficient Xref_rev after the adjustment in the coefficient storing unit 204. In this case, if the gray balance coefficient Xref_rev previously adjusted is stored in the coefficient storing unit 204, the gray balance coefficient Xref_rev may be updated with the newly adjusted gray balance coefficient Xref_rev. Then, the processing of the gray balance coefficient adjustment is ended.

In the image forming apparatus 1 after the gray balance coefficient is adjusted, the shading compensating unit 205 applies a shading compensation to the reading value Dx of the original document M read by the image reading unit 201 by the fifth equation below using the white-reference-plate reading value Wx newly read by the image reading unit 201 with respect to the white reference plate 113, and obtains the compensated reading value Dsh_x.

$$\text{Dsh\_x} = \frac{Dx - Bx}{Wx - Bx} \times \frac{255}{\text{Xref\_rev}} \qquad \text{Fifth Equation}$$

The effect of the adjustment of the gray balance coefficient in the image forming apparatus 1 according to an embodiment of the present disclosure will be described below, as compared with the adjustment of the gray balance coefficient in the typical scanner 11*a* illustrated in FIG. 20. As illustrated in FIG. 7A, in the adjustment of the gray balance coefficient in the typical scanner 11*a*, the part difference in the replacement of the part is the compensation target. However, as described above, the difference occurs between the reading condition of the reading value before shipment and the reading condition of the reading value after the gain is adjusted after the replacement of the part, and the variation based on the difference is out of the compensation target. Accordingly, in the shading compensation of the reading value using the gray balance coefficient after adjustment, the variation of the reading value due to the difference in the reading condition cannot be compensated.

As illustrated in FIG. 7B, in the adjustment of the gray balance coefficient in the image forming apparatus 1 according to the first embodiment of the present embodiment, the part difference in the replacement of the part is the compensation target. Further, as described above, the reading condition of the reading operation by the image reading unit 201 after the replacement of the part is set to be the same as the reading condition at the time of reading the white reference plate 113 before shipment. Accordingly, the gray balance coefficient can be adjusted without the difference in the reading conditions before shipment and after the replacement of the part. As a result, the variation of the reading value due to the difference in the reading condition is not generated by the shading compensation of the reading value due to the gray balance coefficient after adjustment, and the gray balance coefficient can be adjusted with high accuracy.

As described above, in the image forming apparatus 1 according to an embodiment of the present disclosure, the image reading unit 201 reads the white reference plate 113, and the coefficient calculation unit 202 adjusts the gray balance coefficient based on the white-reference-plate reading value of the white reference plate 113 (first reading value) read by the image reading unit 201 under the predetermined reading condition and the white-reference-plate reading value of the white reference plate 113 (second reading value) read by the image reading unit 201 under the same reading condition as the reading condition described above. As a result, an image reading apparatus does not include a reference plate other than a white reference plate and can adjust a gray balance coefficient with high accuracy.

Second Embodiment The image forming apparatus according to the second embodiment of the present disclosure will be described with a focus on the differences from the image forming apparatus 1 according to the first embodiment of the present disclosure. In the first embodiment of the present disclosure described above, the reading operation of the white reference plate 113 after the replacement of the part has been described. In the operation, a reading condition is set to be the same as the reading condition at the time of reading the white reference plate 113 before shipment, and the white reference plate after the replacement of the part is read. In the second embodiment of the present disclosure, an operation of reading the white reference plate 113 under the same reading condition of the light quantity of the light source of the image reading unit 201 and the reading gain (sensitivity) of the sensor of the image reading unit 201 will be described. The overall configuration of the image forming apparatus, the configuration of the scanner 11, and the hardware configuration of the image forming apparatus according to the second embodiment of the present disclosure are the same as those described in the first embodiment.

Figure 8:
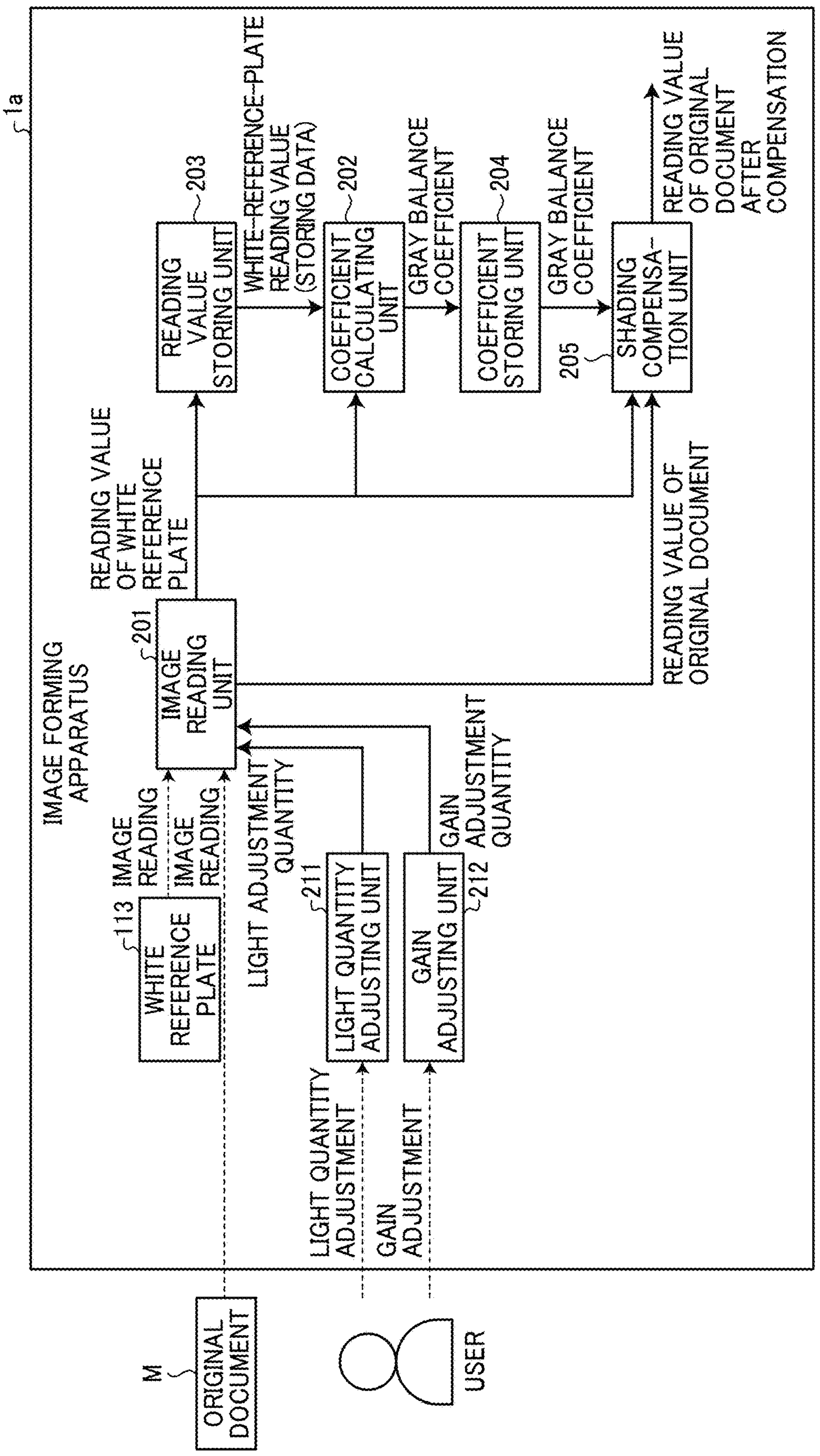
FIG. 8 is a diagram illustrating a configuration of a functional block of an image forming apparatus according to a second embodiment of the present disclosure.

Configuration and Operation of Functional Block of Image Forming Apparatus FIG. 8 is a diagram illustrating the configuration of the functional block of the image forming apparatus according to the second embodiment of the present disclosure. Referring to FIG. 8, the functional block and the operation of the image forming apparatus 1*a* according to an embodiment of the present disclosure will be described.

As illustrated in FIG. 8, the image forming apparatus 1*a* includes an image reading unit 201 (reading unit), a coefficient calculating unit 202 (coefficient adjusting unit), a reading value storing unit 203 (storing unit), a coefficient storing unit 204, a shading compensating unit 205 (correcting unit), a light quantity adjusting unit 211 (first adjusting unit), and a gain adjusting unit 212 (second adjusting unit). The operations of the coefficient calculating unit 202, the reading value storing unit 203, the coefficient storing unit 204, and the shading compensating unit 205 are as described in the first embodiment of the present disclosure.

The light quantity adjusting unit 211 is a functional unit that adjusts the light quantity of the light source of the image reading unit 201 in response to a light quantity adjusting operation by a user via the operation panel 940 after the replacement of the part. Specifically, the light quantity adjusting unit 211 outputs the light adjustment quantity corresponding to the light quantity adjusting operation to the image reading unit 201, and the image reading unit 201 controls the light quantity of the light source according to the light quantity adjusting amount. For example, when the image reading unit 201 controls the light source by pulse width modulation (PWM) control, the light quantity of the light source can be adjusted by executing an operation of changing the duty ratio of the PWM control via the operation panel 940. The light quantity adjusting unit 211 is achieved by executing a program by, for example, the CPU 901 illustrated in FIG. 3.

The gain adjusting unit 212 is a functional unit that adjusts the gain (sensitivity) of the sensor of the image reading unit 201 in response to a gain adjustment operation by a user via the operation panel 940 after the replacement of the part. Specifically, the gain adjusting unit 212 outputs the gain adjustment amount corresponding to the gain adjustment operation to the image reading unit 201, and the image reading unit 201 controls the gain (sensitivity) of the sensor according to the gain adjustment amount. The gain adjusting unit 212 is achieved by executing a program by, for example, the CPU 901 illustrated in FIG. 3.

In some embodiments, an image reading apparatus includes a white reference plate, a reading unit to read the white reference plate, and circuitry to cause the reading unit to read the white reference plate under a first reading condition before shipment of the image reading apparatus to obtain a first reading value, and cause the reading unit to read the white reference plate under a second reading condition same with the first reading condition after replacement of a part of the image reading apparatus after the shipment to obtain a second reading value; and adjust a gray balance coefficient based on the first reading value and the second reading value.

In some embodiments, in the image reading apparatus, the circuitry further causes the reading unit to read an original document to obtain a third reading value, performs a shading compensation on the third reading value of the original document using the gray balance coefficient adjusted by the circuitry.

In some embodiments, the image reading apparatus further includes a light source to emit light and a sensor to detect the light. The first reading condition has a light quantity of the light source and a sensitivity of the sensor. The circuitry further adjusts a light quantity of the light source and a sensitivity of the sensor of the second reading condition to be same with the first reading condition and causes the reading unit to read the white reference plate to obtain the second reading value under the second reading condition.

In some embodiments, in the image reading apparatus, the circuitry adjusts the light quantity of the light source in response to an input receipt by an operation unit and adjusts the sensitivity of the sensor in response to the input receipt by the operation unit.

In some embodiments, the image reading apparatus further includes a storing unit to store the light quantity of the light source and the sensitivity of the first reading value. The circuitry reads the light quantity of the first reading condition from the storing unit, adjusts a light quantity of the second reading condition to be same as the first reading condition and cause the reading unit to obtain the second reading value, reads the sensitivity of the first reading condition from the storing unit, and adjusts a sensitivity of the second reading condition to be same as the first reading condition and cause the reading nit to obtain the second reading value.

In some embodiments, in the image reading apparatus, the circuitry causes the sensor to detect a light quantity of light reflected from a surface of the white reference plate, and cause the storage to store the light quantity in a storing unit as the first reading condition, and adjusts the light quantity of the light reflected from the surface of the white reference plate under the second reading condition to be same as the first reading condition, and cause the reading unit to obtain the second reading value.

In some embodiments, in the image reading apparatus, the circuitry detects the replacement of the part of the image reading apparatus and causes the reading unit to obtain the second reading value in response to a detection of the replacement of the part of the image reading apparatus.

At least a part of the functional units achieved by software (program) among the functional units of the image forming apparatus 1*a* illustrated in FIG. 8 may be achieved by a hardware circuit such as an FPGA or an ASIC.

The functional units of the image forming apparatus 1*a* illustrated in FIG. 8 conceptually illustrate the functions, but the functional units are not limited to the configuration in FIG. 8. For example, multiple functional units illustrated as independent functional units in the image forming apparatus 1*a* illustrated in FIG. 8 may be configured as one functional unit. On the other hand, in the image forming apparatus 1*a* illustrated in FIG. 8, the function of one functional unit may be divided into multiple functional units.

Figure 9:
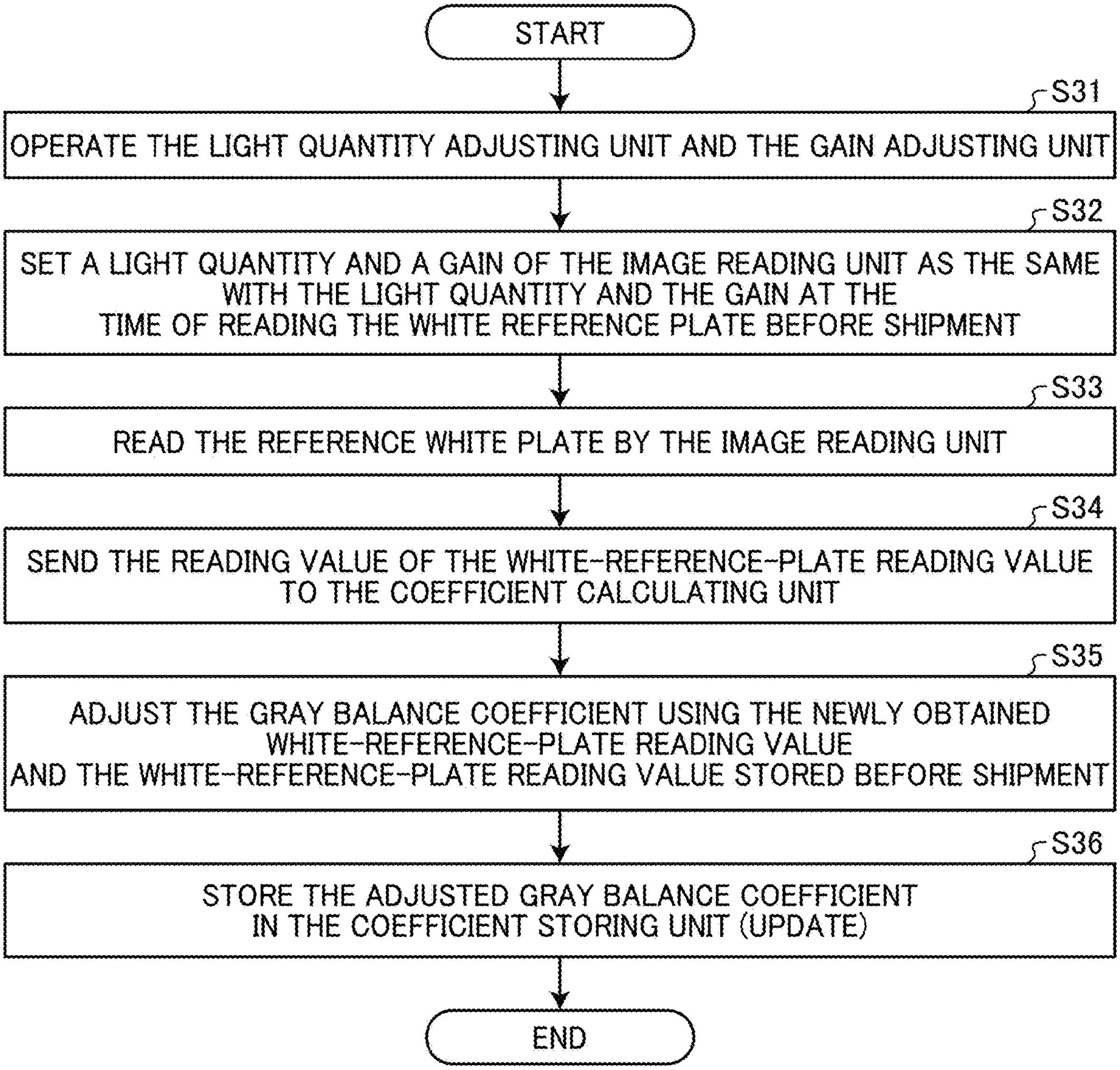
FIG. 9 is a flowchart of the processes of gray balance coefficient adjustment in the image forming apparatus of FIG. 8 according to the second embodiment of the present disclosure.
Figure 10B:
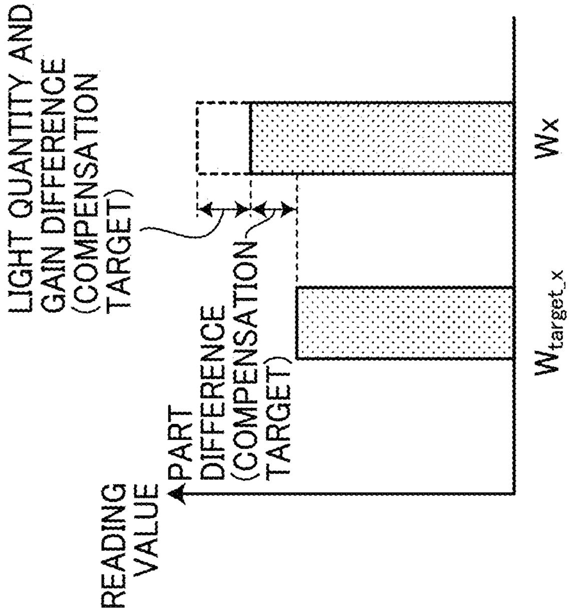
FIG. 10B is a diagram illustrating an effect of compensation in light quantity and gain, in the image forming apparatus of FIG. 8 according to the second embodiment of the present disclosure.
Figure 10A:
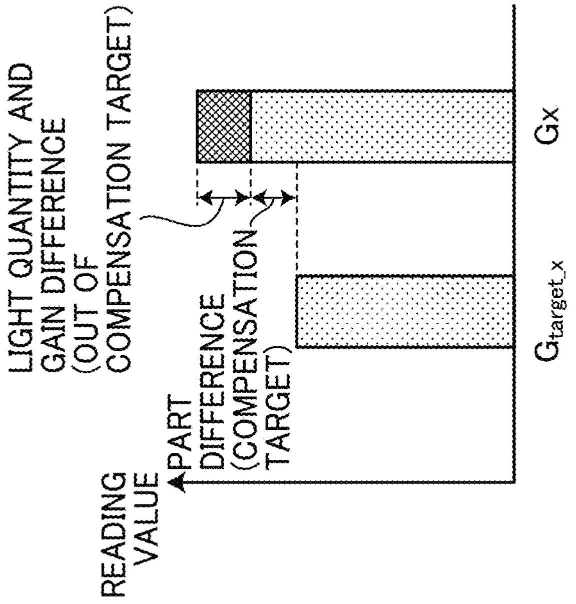
FIG. 10A is a diagram illustrating an effect achieved by the image forming apparatus of FIG. 8 without compensation, according to the second embodiment of the present disclosure.

Processing of Gray Balance Coefficient Adjustment of Image Forming Apparatus FIG. 9 is a flowchart of the processing flow of the gray balance coefficient adjustment of the image forming apparatus according to the second embodiment of the present disclosure. FIGS. 10A and 10B are diagrams describing the effect of the image forming apparatus 1*a* according to the second embodiment of the present disclosure. Referring to FIGS. 9, 10A, and 10B, a processing flow of the gray balance coefficient adjustment of the image forming apparatus 1*a* according to an embodiment of the present disclosure will be described.

Step S31 After the replacement of the part, the light quantity adjusting operation and the gain adjusting operation via the operation panel 940 are operated by a user. The light quantity adjusting unit 211 outputs the light adjustment quantity corresponding to the light quantity adjusting operation to the image reading unit 201. The gain adjusting unit 212 outputs the gain adjusting quantity corresponding to the gain adjusting operation to the image reading unit 201. Then, the process proceeds to step S32.

Step S32 The image reading unit 201 sets the light adjustment quantity from the light quantity adjusting unit 211 to be the same as the light quantity (serving as a reading condition) of the light source at the time of reading the white reference plate 113 before shipment. The image reading unit 201 sets the gain adjusting amount from the gain adjusting unit 212 to be the same as the gain (sensitivity) of the sensor (serving as a reading condition) at the time of reading the white reference plate 113 before shipment. The same light quantity and gain may include a light quantity and gain having a degree that can solve the adjustment difference of the gray balance coefficient in the related art other than precisely the same reading condition. Then, the process proceeds to step S33.

Steps S33 to S36 The processing of steps S33 to S36 is the same as the processing of steps S22 to S25 illustrated in FIG. 6, respectively. Then, the processing of the gray balance coefficient adjustment is ended.

The effect of the adjustment of the gray balance coefficient in the image forming apparatus 1*a* according to the second embodiment of the present disclosure will be described below, as compared with the adjustment of the gray balance coefficient in the typical scanner 11*a* illustrated in FIG. 20. As illustrated in FIG. 10A, in the adjustment of the gray balance coefficient in the typical scanner 11*a*, the part difference in the replacement of the part is the compensation target. However, as described above, a difference occurs between the light quantity of the light source and the gain (sensitivity) of the sensor in the reading operation before shipment and the light quantity and the gain (sensitivity) after the light quantity adjustment and the gain adjustment are performed after replacement of the part, and the variation based on the difference is the compensation target. Accordingly, in the shading compensation of the reading value using the gray balance coefficient after the adjustment, the variation of the reading value due to the difference cannot be compensated.

As illustrated in FIG. 10B, in the adjustment of the gray balance coefficient in the image forming apparatus 1*a* according to the second embodiment of the present disclosure, the part difference in the replacement of the part is the compensation target. Further, as described above, the light quantity of the light source and the gain (sensitivity) of the sensor of the reading operation by the image reading unit 201 after the replacement of the part are set to be the same as the light quantity and the gain at the time of reading the white reference plate 113 before shipment. Accordingly, the gray balance coefficient can be adjusted without the difference in the light quantity and the gain between before shipment and after replacement of the part. As a result, the variation of the reading value due to the difference in the light quantity and the gain is not generated by the shading compensation of the reading value due to the gray balance coefficient after adjustment, and the gray balance coefficient can be adjusted with high accuracy.

As described above, in the image forming apparatus 1*a* according to an embodiment of the present disclosure, the light quantity adjusting unit 211 adjusts the light quantity of the light source of the image reading unit 201 in response to the user's operation to the operation panel 940. The gain adjusting unit 212 adjusts the sensitivity of the sensor of the image reading unit 201 in response to the user's operation to the operation panel 940. The image reading unit 201 sets the light quantity adjusted by the light quantity adjusting unit 211 and the sensitivity adjusted by the gain adjusting unit 212 to be the same as the reading conditions before shipment, and obtains the white-reference-plate reading value (second reading value) by reading the white reference plate 113. Accordingly, the gray balance coefficient can be adjusted without the difference in the light quantity and the gain between before shipment and after replacement of the part. As a result, the variation of the reading value due to the difference in the light quantity and the gain is not generated by the shading compensation of the reading value due to the gray balance coefficient after adjustment, and the gray balance coefficient can be adjusted with high accuracy.

Third Embodiment The image forming apparatus according to the third embodiment of the present disclosure will be described with a focus on the differences from the image forming apparatus 1*a* according to the second embodiment of the present disclosure. In the second embodiment of the present disclosure described above, the reading operation of the white reference plate 113 after the replacement of the part has been described. In the reading operation, the light quantity of the light source and the gain (sensitivity) of the sensor are manually adjusted by a user to the same as the light quantity of the light source and the gain (sensitivity) of the sensor at the time of reading the white reference plate 113 before shipment, and the white reference plate 113 after replacement of the part is read. In the third embodiment of the present disclosure, an operation automatically adjusting the light quantity and the gain will be described. The overall configuration of the image forming apparatus 1*b*, the configuration of the scanner 11, and the hardware configuration of the image forming apparatus 1*b* according to the third embodiment of the present disclosure are the same as those described in the first embodiment.

Figure 11:
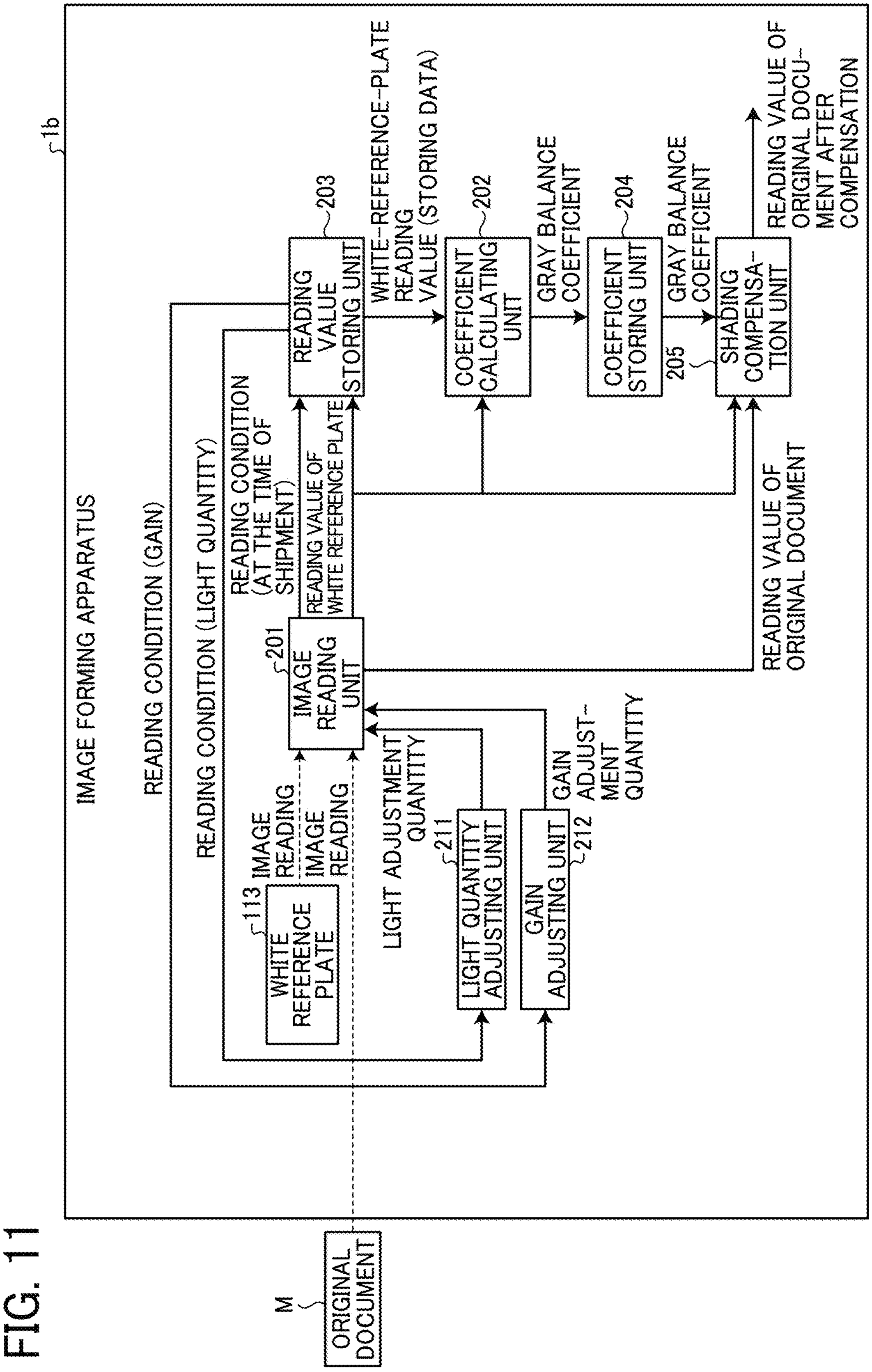
FIG. 11 is a diagram illustrating a configuration of a functional block of an image forming apparatus according to a third embodiment of the present disclosure.

Configuration and Operation of Functional Block of Image Forming Apparatus FIG. 11 is a diagram illustrating a configuration of a functional block of the image forming apparatus 1*b* according to the third embodiment of the present disclosure. Referring to FIG. 11, the functional block and the operation of the image forming apparatus 1*b* according to an embodiment of the present disclosure will be described.

As illustrated in FIG. 11, the image forming apparatus 1*b* includes an image reading unit 201 (reading unit), a coefficient calculating unit 202 (coefficient adjusting unit), a reading value storing unit 203 (storing unit), a coefficient storing unit 204, a shading compensating unit 205 (correcting unit), a light quantity adjusting unit 211 (first adjusting unit), and a gain adjusting unit 212 (second adjusting unit). The operations of the coefficient calculating unit 202, the coefficient storing unit 204, and the shading compensating unit 205 are as described in the first embodiment of the present disclosure.

The image reading unit 201 stores the reading condition (the light quantity and the gain) at the time of reading the white reference plate 113 in the reading value storing unit 203 before shipment.

After the replacement of the part, the light quantity adjusting unit 211 reads the light quantity of the reading condition stored in the image reading unit 201 (stored light quantity), and adjusts the light quantity of the light source of the image reading unit 201 so that the light quantity becomes the stored light quantity.

After the replacement of the part, the gain adjusting unit 212 reads the gain (sensitivity) of the reading condition stored in the image reading unit 201 (stored gain), and adjusts the gain of the image reading unit 201 so that the gain becomes the stored gain.

At least a part of the functional units achieved by software (program) among the functional units of the image forming apparatus 1*b* illustrated in FIG. 11 may be achieved by a hardware circuit such as an FPGA or an ASIC.

The functional units of the image forming apparatus 1*b* illustrated in FIG. 11 conceptually illustrate the functions, but the functional units are not limited to the configuration in FIG. 11. For example, the multiple functional units illustrated as independent functional units in the image forming apparatus 1*b* illustrated in FIG. 11 may be configured as one functional unit. On the other hand, in the image forming apparatus 1*b* illustrated in FIG. 11, the function of one functional unit may be divided into multiple functional units.

Figure 12:
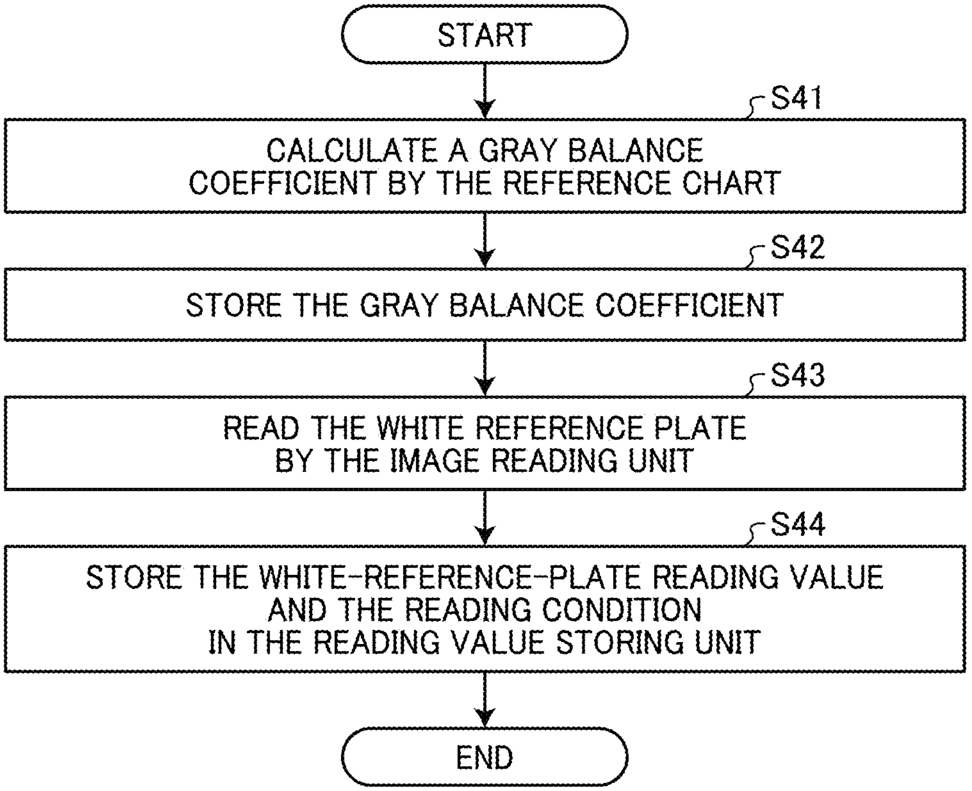
FIG. 12 is a flowchart of processing before shipment of the image forming apparatus of FIG. 11 according to the third embodiment of the present disclosure.

Processing of Image Forming Apparatus before Shipment FIG. 12 is a flowchart of processing before the shipment of the image forming apparatus according to the third embodiment of the present disclosure. Referring to FIG. 12, processing before shipment of the image forming apparatus 1*b* according to the third embodiment of the present disclosure will be described.

Steps S41 to S43 The processing of steps S41 to S43 is the same as the processing of steps S11 to S13 illustrated in FIG. 5, respectively. Then, the process proceeds to step S44.

Step S44 The image reading unit 201 stores the white-reference-plate reading value as the reference value $W_{target\_x}$ in the reading value storing unit 203, and stores the reading condition (the light quantity and the gain) at this time in the reading value storing unit 203. Then, the processing before shipment ends.

Figure 13:
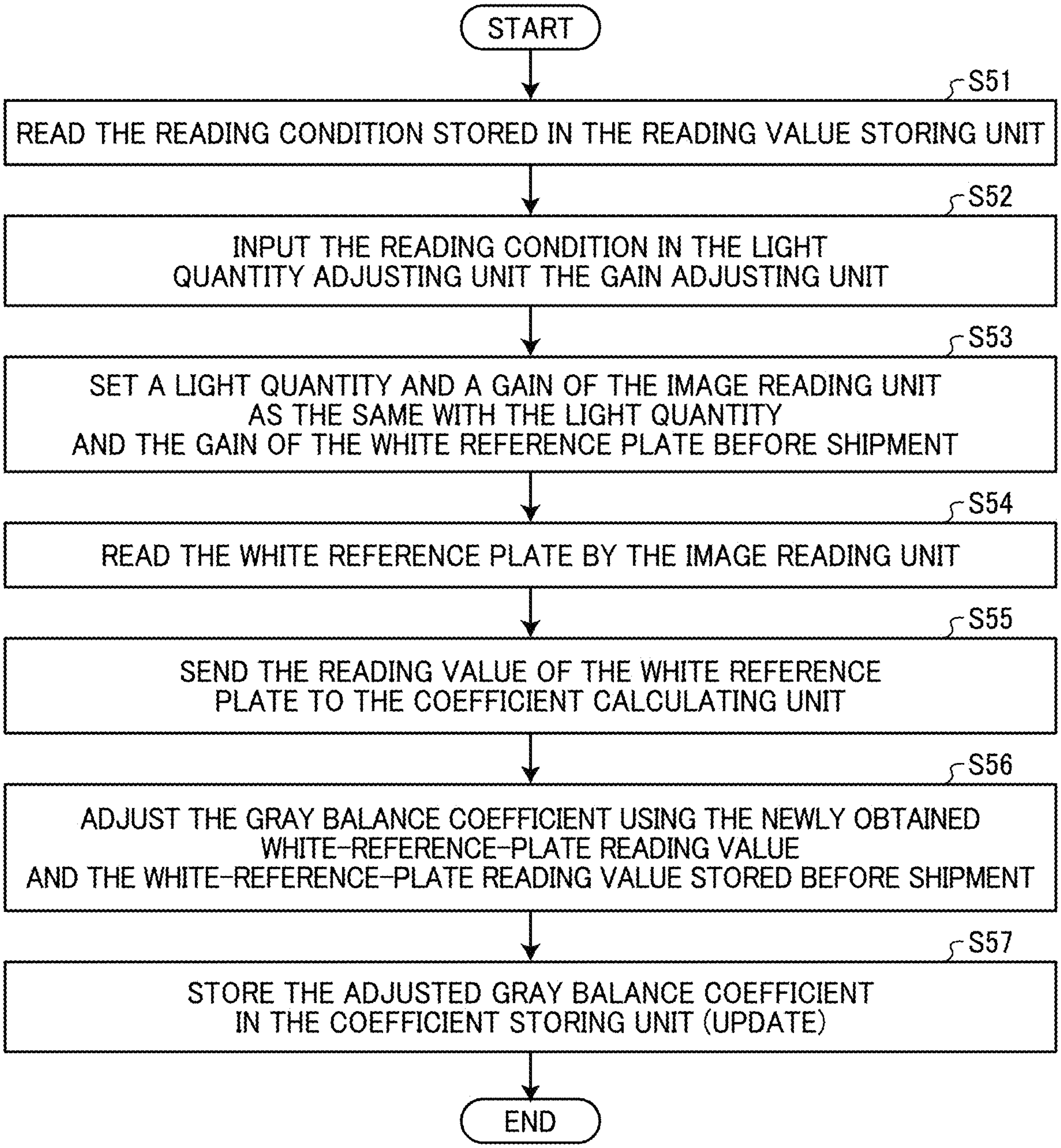
FIG. 13 is a flowchart of processing of gray balance coefficient adjustment of the image forming apparatus of FIG. 11 according to the third embodiment of the present disclosure.

Processing of Gray Balance Coefficient Adjustment of Image Forming Apparatus FIG. 13 is a flowchart of the processing flow of the gray balance coefficient adjustment of the image forming apparatus 1*b* according to the third embodiment of the present disclosure. Referring to FIGS. 13, a processing flow of the gray balance coefficient adjustment of the image forming apparatus 1*b* according to the third embodiment of the present disclosure will be described.

Step S51 The light quantity adjusting unit 211 reads the light quantity of the reading condition before shipment from the reading value storing unit 203. The gain adjusting unit 212 reads the gain of the reading condition before shipment from the reading value storing unit 203. Then, the process proceeds to step S52.

Step S52 The light quantity adjusting unit 211 inputs the light quantity before shipment read from the reading value storing unit 203 in the light quantity adjusting unit 211, and outputs a light adjustment quantity for adjusting a light quantity to the light quantity before shipment to the image reading unit 201. The gain adjustment unit 212 inputs the gain (sensitivity) before shipment read from the reading value storing unit 203 in the gain adjustment unit 212, and outputs a gain adjustment quantity for adjusting to the gain before shipment to the image reading unit 201. Then, the process proceeds to step S53.

Step S53 The image reading unit 201 sets the light adjustment quantity from the light quantity adjusting unit 211 to be the same as the light quantity (serving as a reading condition) of the light source at the time of reading the white reference plate 113 before shipment. The image reading unit 201 sets the gain adjusting amount from the gain adjusting unit 212 to be the same as the gain (sensitivity) of the sensor (serving as a reading condition) at the time of reading the white reference plate 113 before shipment. Then, the process proceeds to step S54.

Steps S54 to S57 The processing of steps S54 to S57 is the same as the processing of steps S33 to S36 illustrated in FIG. 9, respectively. Then, the processing of the gray balance coefficient adjustment is ended.

Accordingly, in the third embodiment of the present disclosure as in the second embodiment of the present disclosure, the gray balance coefficient can be adjusted without the difference in the light quantity and the gain between before shipment and after replacement of the part. As a result, the variation of the reading value due to the difference in the light quantity and the gain is not generated by the shading compensation of the reading value due to the gray balance coefficient after adjustment, and the gray balance coefficient can be adjusted with high accuracy.

As described above, in the image forming apparatus 1*b* according to the third embodiment of the present disclosure, the image reading unit 201 stores the light quantity of the light source and the sensitivity of the sensor when the reading value of the white reference plate (first reading value) is read in the reading value storing unit 203. The light quantity adjusting unit 211 reads the light quantity stored in the reading value storing unit 203 and adjusts a light quantity of light source to the light quantity stored in the reading value storing unit 203 when the image reading unit 201 reads the white-reference-plate reading value (second reading value). The gain adjusting unit 212 reads the sensitivity stored in the reading value storing unit 203 and adjusts the sensitivity of the sensor to the sensitivity stored in the reading value storing unit when the image reading unit 201 reads the-white-reference plate reading value (second reading value). Accordingly, the gray balance coefficient can be automatically adjusted instead of the setting operation by a user in spite of the reading condition set before shipment. As a result, the number of man-hours of the operator can be reduced. Further, in the third embodiment of the present disclosure as in the second embodiment of the present disclosure described above, the gray balance coefficient can be adjusted without the difference in the light quantity and the gain between before shipment and after replacement of the part. As a result, the variation of the reading value due to the difference in the light quantity and the gain is not generated by the shading compensation of the reading value due to the gray balance coefficient after adjustment, and the gray balance coefficient can be adjusted with high accuracy.

Fourth Embodiment The image forming apparatus 1*c* according to the fourth embodiment of the present disclosure will be described with a focus on the differences from the image forming apparatus 1*b* according to the third embodiment of the present disclosure. In the fourth embodiment of the present disclosure, an operation of the gray balance coefficient adjustment process using an execution operation by a user as a trigger will be described. The overall configuration of the image forming apparatus 1*c*, the configuration of the scanner 11, and the hardware configuration of the image forming apparatus 1*b* according to the first embodiment of the present disclosure are the same as those described in the first embodiment.

Figure 14:
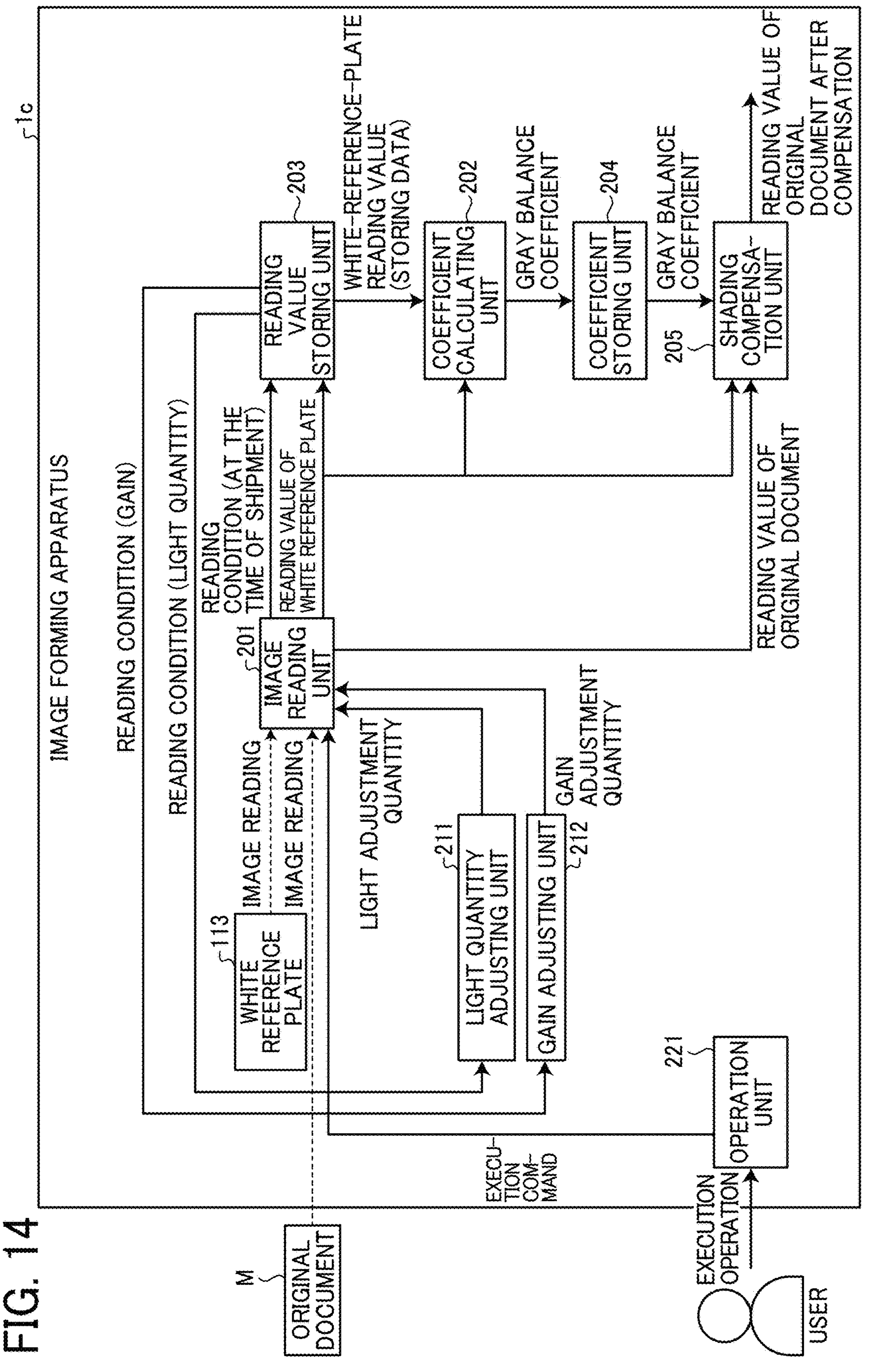
FIG. 14 is a diagram illustrating a configuration of a functional block of an image forming apparatus according to a fourth embodiment of the present disclosure.

Configuration and Operation of Functional Block of Image Forming Apparatus FIG. 14 is a diagram illustrating the configuration of the functional block of the image forming apparatus 1*c* according to the fourth embodiment of the present disclosure. Referring to FIG. 14, the functional block and the operation of the image forming apparatus 1*c* according to the fourth embodiment of the present disclosure will be described.

As illustrated in FIG. 14, the image forming apparatus 1*c* includes an image reading unit 201 (reading unit), a coefficient calculating unit 202 (coefficient adjusting unit), a reading value storing unit 203 (storing unit), a coefficient storing unit 204, a shading compensating unit 205 (correcting unit), a light quantity adjusting unit 211 (first adjusting unit), and a gain adjusting unit 212 (second adjusting unit). The operations of the image reading unit 201, the coefficient calculating unit 202, the reading value storing unit 203, the coefficient storing unit 204, the shading compensating unit 205, the light quantity adjusting unit 211, and the gain adjusting unit 212 are as described in the third embodiment.

The operation unit 221 is a functional unit that receives an execution operation by a user after replacement of the part and outputs an execution command serving as a trigger for starting the processing of the gray balance coefficient adjustment to the image reading unit 201 to the image reading unit 201. In other words, when the image reading unit 201 receives the execution command, the image forming apparatus 1*c* executes the process of the gray balance coefficient adjustment illustrated in FIG. 13. The operation unit 221 is achieved by the operation panel 940 illustrated in FIG. 3.

In some embodiments, in the image reading apparatus, the circuitry further causes the reading unit to read the second reading value in response to the input receipt by an operation unit.

At least a part of the functional units achieved by software (program) among the functional units of the image forming apparatus 1*c* illustrated in FIG. 14 may be achieved by a hardware circuit such as an FPGA or an ASIC.

The functional units of the image forming apparatus 1*c* illustrated in FIG. 14 conceptually illustrate the functions, but the functional units are not limited to the configuration in FIG. 14. For example, multiple functional units illustrated as independent functional units in the image forming apparatus 1*c* illustrated in FIG. 14 may be configured as one functional unit. On the other hand, in the image forming apparatus 1*c* illustrated in FIG. 14, the function of one functional unit may be divided into multiple functional units.

As described above, in the image forming apparatus 1*c* according to the fourth embodiment of the present disclosure, the image reading unit 201 reads the reading value of the white reference plate (second reading value) in response to the user's operation on the operation unit 221. Accordingly, since the process of the gray balance coefficient adjustment processing can be executed in response to an execution operation at the operation unit 221 by the user, the gray balance coefficient can be adjusted at any timing of the user.

Fifth Embodiment The image forming apparatus 1*d* according to the fifth embodiment of the present disclosure will be described with a focus on the differences from the image forming apparatus 1*b* according to the third embodiment of the present disclosure. In the fifth embodiment of the present disclosure, an operation will be described. In the operation, the light quantity of the light source before shipment is stored, and the light source is controlled to have the light quantity when the image reading unit 201 reads the original document after the replacement of the part. The overall configuration of the image forming apparatus 1*c*, the configuration of the scanner 11, and the hardware configuration of the image forming apparatus 1 according to the first embodiment of the present disclosure are the same as those described in the first embodiment.

Figure 15:
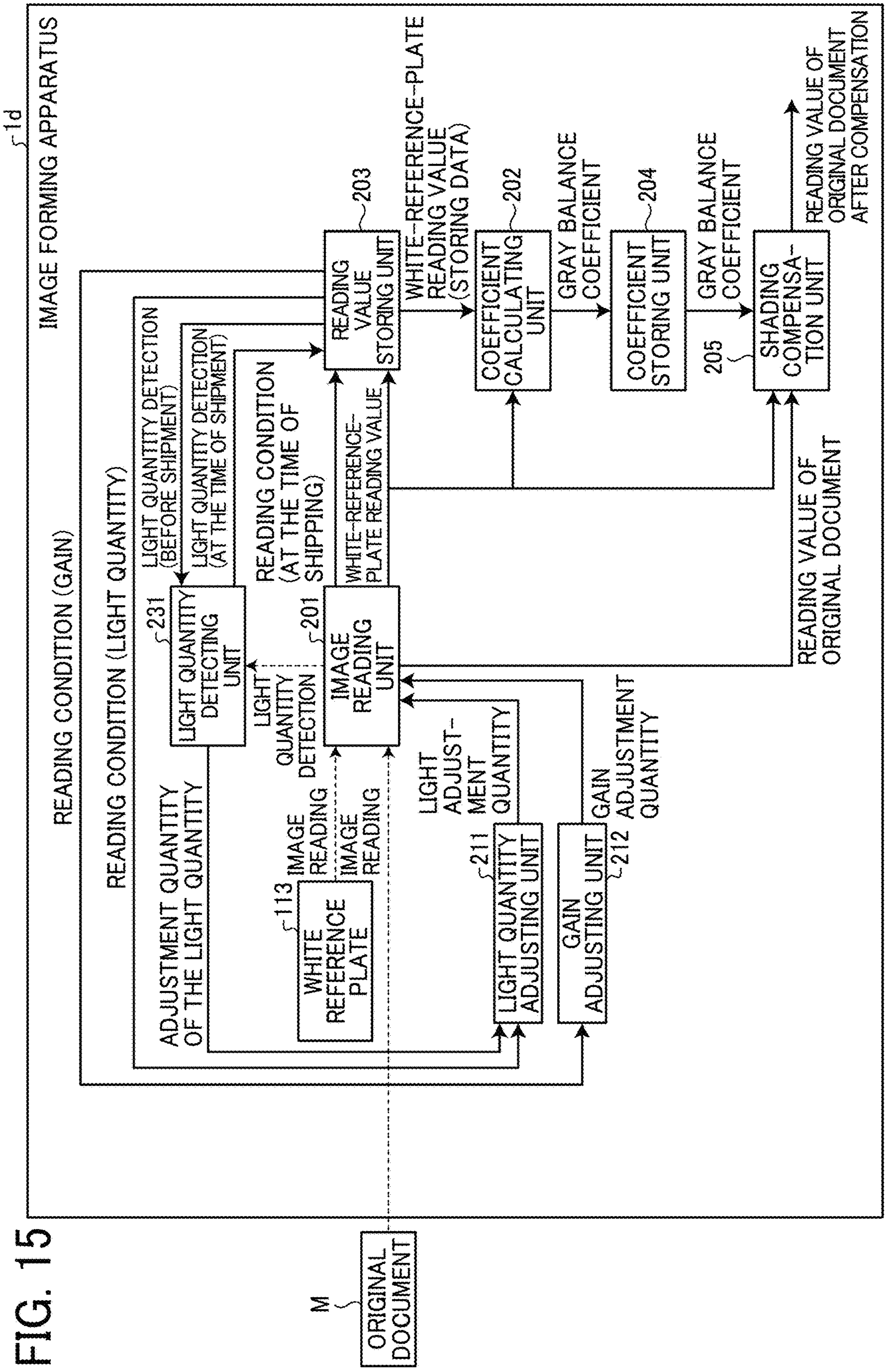
FIG. 15 is a diagram illustrating a configuration of a functional block of an image forming apparatus according to a fifth embodiment of the present disclosure.

Configuration and Operation of Functional Block of Image Forming Apparatus FIG. 15 is a diagram illustrating the configuration of the functional block of the image forming apparatus 1*d* according to the fifth embodiment of the present disclosure. Referring to FIG. 15, the functional block and the operation of the image forming apparatus 1*d* according to the fifth embodiment of the present disclosure will be described.

As illustrated in FIG. 15, the image forming apparatus 1*d* includes an image reading unit 201 (reading unit), a coefficient calculating unit 202 (coefficient adjusting unit), a reading value storing unit 203 (storing unit), a coefficient storing unit 204, a shading compensating unit 205 (correcting unit), a light quantity adjusting unit 211 (first adjusting unit), a gain adjusting unit 212 (second adjusting unit), and a light quantity detecting unit 231. The coefficient calculating unit 202, the reading value storing unit 203, the coefficient storing unit 204, the shading compensating unit 205, the light quantity adjusting unit 211, and the gain adjusting unit 212 are as described in the third embodiment.

The light quantity detecting unit 231 is a functional unit that detects the light quantity of the document surface (the surface of the white reference plate 113) when the image reading unit 201 reads the document surface before shipment and stores the light quantity (detected light quantity) in the reading value storing unit 203. After the replacement of the part, the light quantity detecting unit 231 reads the detected light quantity from the reading value storing unit 203, detects the light quantity of the present document surface (the surface of the white reference plate 113), and outputs a light adjustment quantity for matching the present light quantity with the detected light quantity to the light quantity adjusting unit 211. The light quantity detecting unit 231 is achieved by a sensor that can detect the light quantity of the original document surface (the surface of the white reference plate 113) and a control circuit that can output the light adjustment quantity.

After the replacement of the part, the light quantity adjusting unit 211 reads the light quantity of the reading condition stored in the image reading unit 201 (stored light quantity), and sets a light quantity of the light source of the image reading unit 201 to be the same as the stored light quantity. The light quantity adjusting unit 211 adjusts the light quantity of the light source of the image reading unit 201 based on a light adjustment quantity output from the light quantity detecting unit 231 after the replacement of the part.

At least a part of the functional units achieved by software (program) among the functional units of the image forming apparatus 1*d* illustrated in FIG. 15 may be achieved by a hardware circuit such as an FPGA or an ASIC.

The functional units of the image forming apparatus 1*d* illustrated in FIG. 15 conceptually illustrate the functions, but the functional units are not limited to the configuration in FIG. 15. For example, multiple functional units illustrated as independent functional units in the image forming apparatus 1*d* illustrated in FIG. 15 may be configured as one functional unit. On the other hand, in the image forming apparatus 1*d* illustrated in FIG. 15, the function of one functional unit may be divided into multiple functional units.

Processing of Image Forming Apparatus before Shipment

Figure 16:
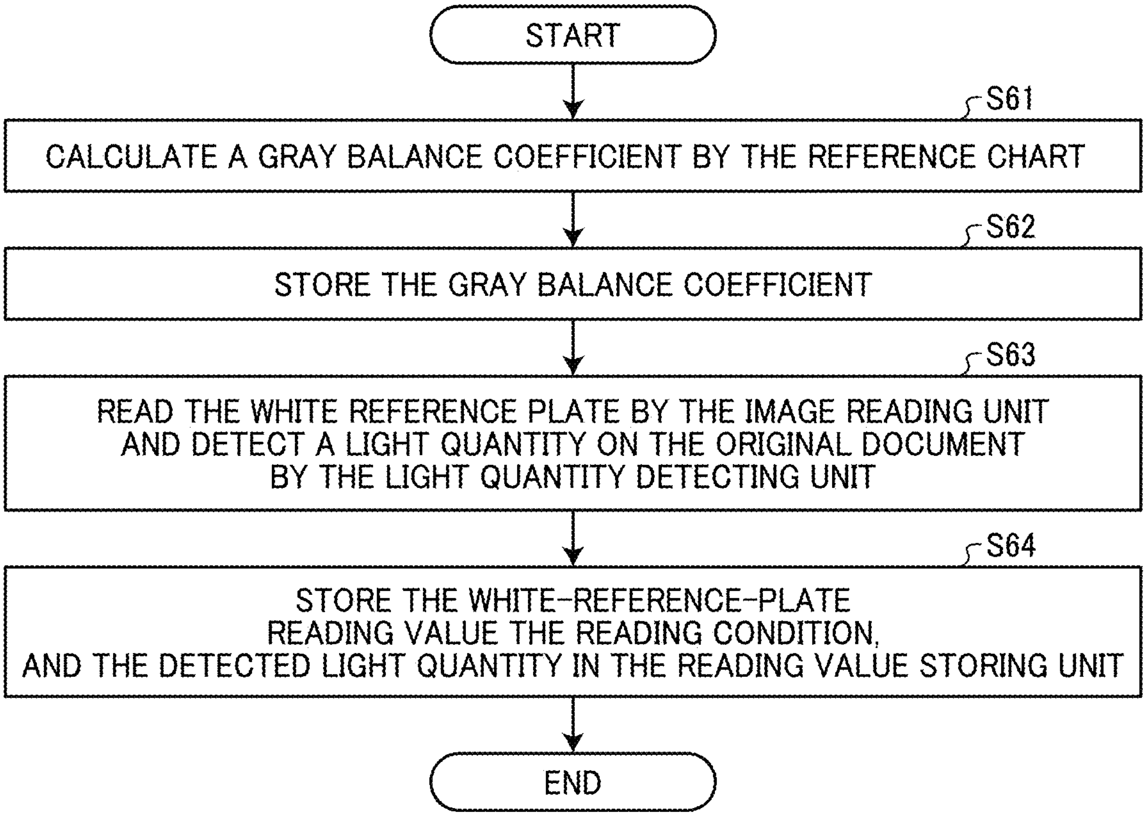
FIG. 16 is a flowchart of processing before shipment of the image forming apparatus of FIG. 15 according to the fifth embodiment of the present disclosure.

FIG. 16 is a flowchart of processing before shipment of the image forming apparatus according to the fifth embodiment of the present disclosure. Referring to FIG. 16, processing before the shipment of the image forming apparatus 1*d* according to the fifth embodiment of the present disclosure will be described.

Steps S61 and S62 The processing of steps S61 and S62 is the same as the processing of steps S41 and S42 illustrated in FIG. 12, respectively. Then, the process proceeds to step S63.

Step S63 The image reading unit 201 reads the white reference plate 113 and obtains a white-reference-plate reading value. The light quantity detecting unit 231 detects the light quantity of the document surface (surface of the white reference plate 113). Then, the process proceeds to step S64.

Step S64 The image reading unit 201 stores the white-reference-plate reading value as the reference value $W_{target\_x}$ in the reading value storing unit 203, and stores the reading condition (the light quantity and the gain) at the present time in the reading value storing unit 203. The light quantity detecting unit 231 stores the detected light quantity (detected light quantity) in the reading value storing unit 203. Then, the processing before shipment ends.

Figure 17:
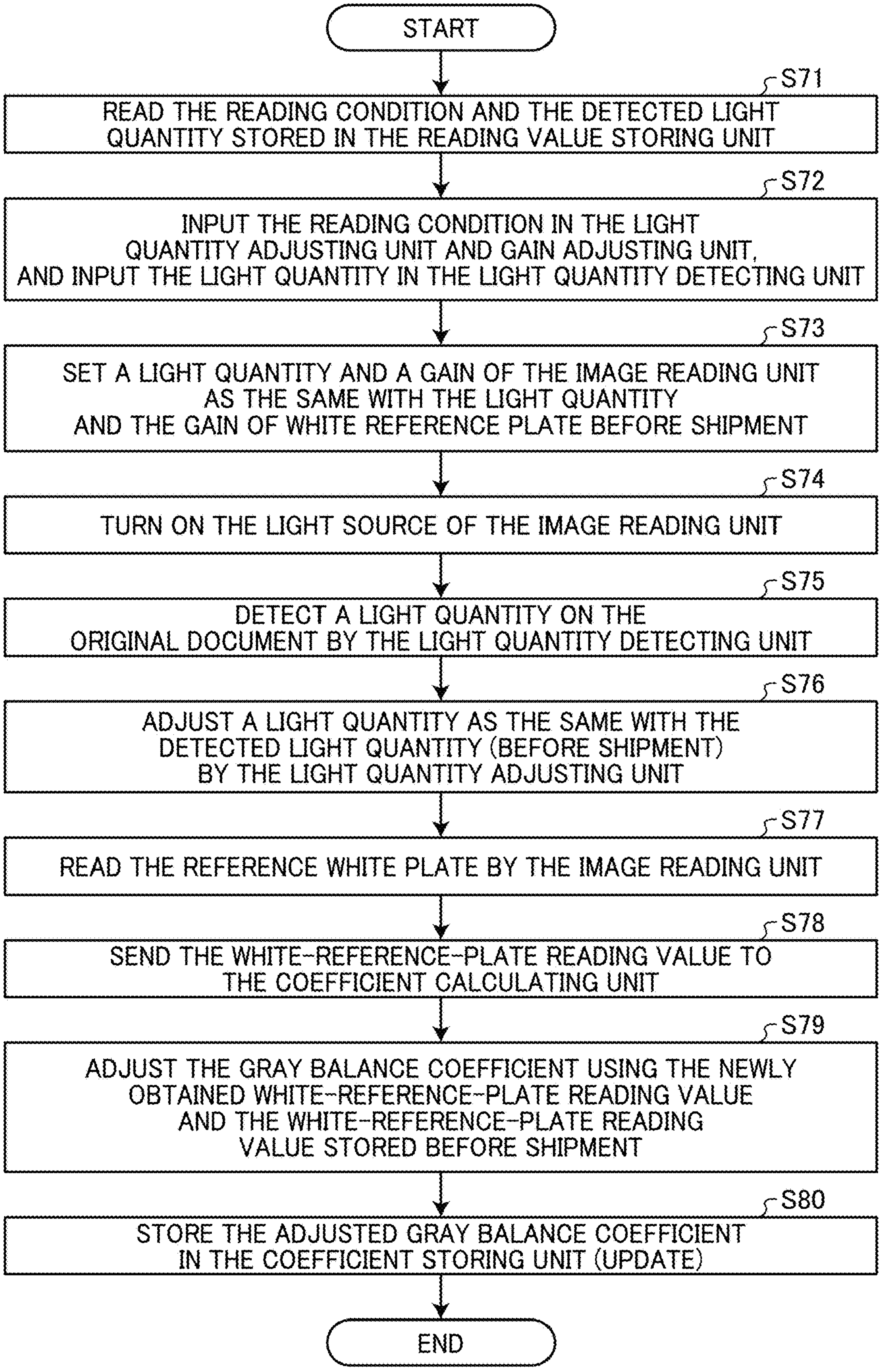
FIG. 17 is a flowchart of processing of gray balance coefficient adjustment of the image forming apparatus of FIG. 15 according to the fifth embodiment of the present disclosure.
Figure 18A:
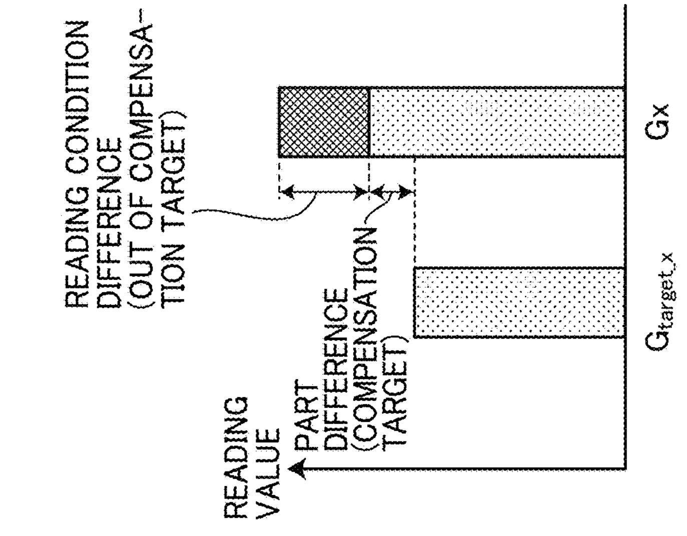
FIG. 18A is a diagram illustrating an effect achieved by the image forming apparatus without compensation, according to the fifth embodiment of the present disclosure.
Figure 18B:
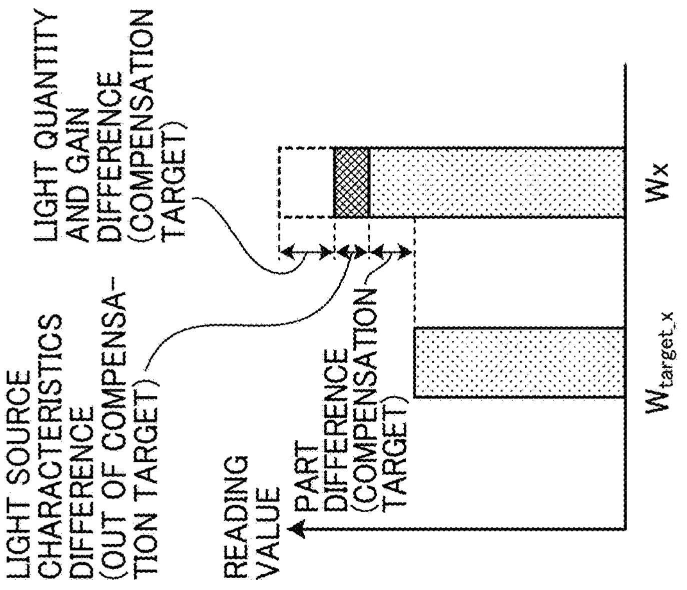
FIG. 18B is a diagram illustrating an effect of compensation in reading condition, in the image forming apparatus of FIG. 15 according to the fifth embodiment of the present disclosure.
Figure 18C:
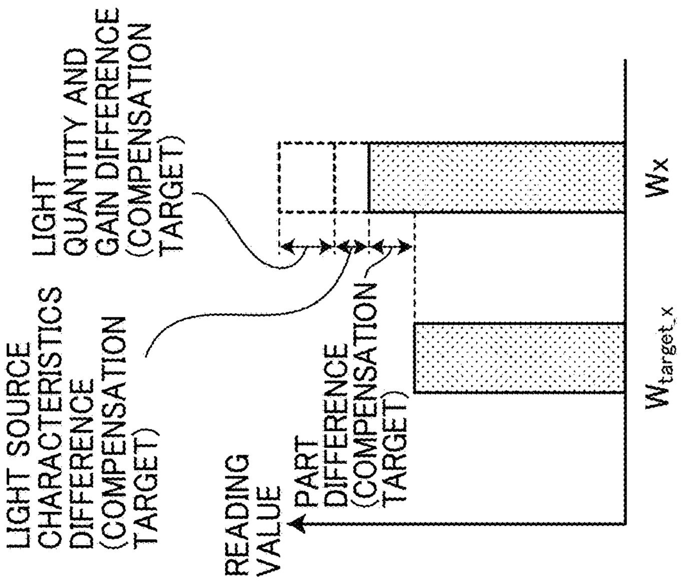
FIG. 18C is a diagram illustrating an effect of compensation in reading condition, light quantity, and gain, in the image forming apparatus of FIG. 15 according to the fifth embodiment of the present disclosure.

Processing of Gray Balance Coefficient Adjustment of Image Forming Apparatus FIG. 17 is a flowchart of the processing flow of the gray balance coefficient adjustment of the image forming apparatus 1*d* according to the fifth embodiment of the present disclosure. FIGS. 18A, 18B, and 18C are diagrams illustrating the effect achieved by the image forming apparatus 1*d* according to the fifth embodiment of the present disclosure. Referring to FIGS. 17, 18A, 18B, and 18C, a processing flow of the gray balance coefficient adjustment of the image forming apparatus 1*d* according to the fifth embodiment of the present disclosure will be described.

In some embodiments, an image reading method includes reading a white reference plate under a first reading condition before shipment of the image reading apparatus to obtain a first reading value, reading the white reference plate under a second reading condition same with the first reading condition after replacement of a part of the image reading apparatus after the shipment to obtain a second reading value, and adjusting a gray balance coefficient based on the first reading value and the second reading value.

Step S71 The light quantity adjusting unit 211 reads the light quantity of the reading condition before shipment from the reading value storing unit 203. The gain adjusting unit 212 reads the gain (sensitivity) of the reading condition before shipment from the reading value storing unit 203. The light quantity detecting unit 231 reads the detected light quantity before shipment from the reading value storing unit 203. Then, the process proceeds to step S72.

Step S72 The light quantity detecting unit 231 inputs the detected light quantity read from the reading value storing unit 203 in the light quantity detecting unit 231, and outputs the light adjustment quantity based on the detected light quantity to the light quantity adjusting unit 211. The light quantity adjusting unit 211 inputs the light quantity before shipment read from the reading value storing unit 203 in the light quantity adjusting unit 211, and outputs a light adjustment quantity for adjusting a light quantity to the light quantity before shipment to the image reading unit 201. The gain adjustment unit 212 inputs the gain (sensitivity) before shipment read from the reading value storing unit 203 in the gain adjustment unit 212, and outputs a gain adjustment quantity for adjusting to the gain before shipment to the image reading unit 201. Then, the process proceeds to step S73.

Step S73 The image reading unit 201 sets the light adjustment quantity from the light quantity adjusting unit 211 to be the same as the light quantity (serving as a reading condition) of the light source at the time of reading the white reference plate 113 before shipment. The image reading unit 201 sets the gain adjusting amount from the gain adjusting unit 212 to be the same as the gain (sensitivity) of the sensor (serving as a reading condition) at the time of reading the white reference plate 113 before shipment. Then, the process proceeds to step S74.

Step S74 The image reading unit 201 turns on the light source with the setting light quantity. Then, the process proceeds to step S75.

Step S75 The light quantity detection unit 231 detects the light quantity on the document surface (the surface of the white reference plate 113). Then, the process proceeds to step S76.

Step S76 The light quantity detecting unit 231 outputs the light adjustment quantity to the light quantity adjusting unit 211 so that the detected light quantity of the document surface (the surface of the white reference plate 113) matches the detected light quantity. The light quantity adjusting unit 211 adjusts the light quantity of the light source based on the adjustment quantity output from the light quantity detecting unit 231. Then, the process proceeds to step S77.

Steps S77 to S80 The processing of steps S77 to S80 is the same as the processing of steps S54 to S57 illustrated in FIG. 13, respectively. Then, the processing of the gray balance coefficient adjustment is ended.

The effect of the adjustment of the gray balance coefficient in the image forming apparatus 1*a* according to the second embodiment of the present disclosure will be described below, as compared with the adjustment of the gray balance coefficient in the typical scanner 11*a* illustrated in FIG. 20. As illustrated in FIG. 18A, in the adjustment of the gray balance coefficient in the typical scanner 11*a*, the part difference in the replacement of the part is the compensation target, but as described above, a difference occurs between the reading condition of the reading value before shipment and the reading condition of the reading value after the gain adjustment is performed after replacement of the part, and the variation based on the difference is out of the compensation target. As illustrated in FIG. 18B, in the second to fourth embodiments of the present disclosure, after the replacement of the part, the light quantity of the light source and the gain (sensitivity) of the sensor in the reading operation by the image reading unit 201 are set to be the same as the light quantity and the gain in the reading operation with respect to the white reference plate 113 before shipment. However, the light source of the image reading unit 201 (scanner 11) has a difference in light quantity due to a difference in light source characteristics (serving as a reading condition) such as temperature characteristics even if the same current is applied to the light source. Thus, in the shading compensation of the reading value using the gray balance coefficient after the adjustment, the variation of the reading value due to the difference in the reading condition cannot be compensated. As illustrated in FIG. 18C, in the adjustment of the gray balance coefficient in the image forming apparatus 1*d* according to the fifth embodiment of the present disclosure, the part difference in the replacement of the part and the difference in the light quantity of the light source and the gain (sensitivity) of the sensor are the compensation target. Further, as described above, the difference in the light source characteristic is the compensation target. Accordingly, the gray balance coefficient can be adjusted without the difference in the light quantity and the gain between before shipment and after replacement of the part and the difference in the light source characteristics. As a result, the variation of the reading value due to the difference in the light quantity and the gain and the difference in the light source characteristics is not generated by the shading compensation of the reading value due to the gray balance coefficient after adjustment, and the gray balance coefficient can be adjusted with high accuracy.

As described above, in the image forming apparatus 1*d* according to the fifth embodiment of the present disclosure, the light quantity detecting unit 231 detects the light quantity of the surface of the white reference plate 113 when the image reading unit 201 reads the reading value of the white reference plate 113 (first reading value) and stores the detected light quantity in the reading value storing unit 203, and when the image reading unit 201 reads the reading value of the white reference plate 113 (second reading value), the light quantity adjusting unit 211 adjusts the detected light quantity of the surface of the white reference plate 113 to the light quantity stored in the reading value storing unit 203. Accordingly, the gray balance coefficient can be adjusted without the difference in the light quantity and the gain between before shipment and after replacement of the part and the difference in the light source characteristics. As a result, the variation of the reading value due to the difference in the light quantity and the gain and the difference in the light source characteristics is not generated by the shading compensation of the reading value due to the gray balance coefficient after adjustment, and the gray balance coefficient can be adjusted with high accuracy.

Sixth Embodiment The image forming apparatus 1*e* according to the sixth embodiment of the present disclosure will be described with a focus on the differences from the image forming apparatus 1*b* according to the third embodiment of the present disclosure. In the sixth embodiment of the present disclosure, the operation of detecting the replacement of the part of the scanner 11 and automatically executing the processing of the gray balance coefficient adjustment will be described. The overall configuration of the image forming apparatus 1*a*, the configuration of the scanner 11, and the hardware configuration of the image forming apparatus 1*b* according to the first embodiment of the present disclosure are the same as those described in the first embodiment.

Figure 19:
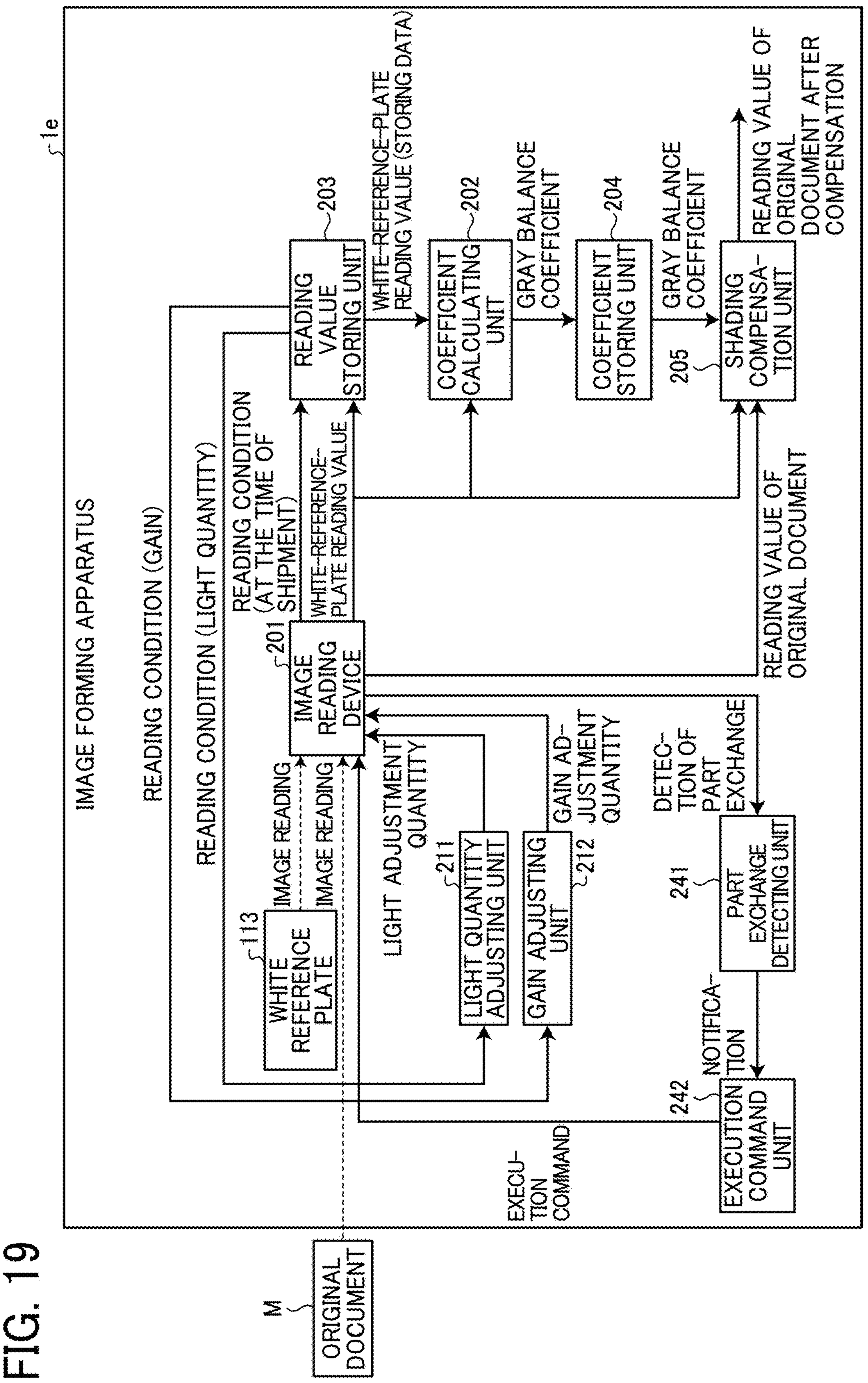
FIG. 19 is a diagram illustrating a configuration of a functional block of an image forming apparatus according to a sixth embodiment of the present disclosure.

Configuration and Operation of Functional Block of Image Forming Apparatus FIG. 19 is a diagram illustrating the configuration of the functional block of the image forming apparatus 1*e* according to the sixth embodiment of the present disclosure. Referring to FIG. 19, the functional block and the operation of the image forming apparatus 1*e* according to the sixth embodiment of the present disclosure will be described.

As illustrated in FIG. 19, the image forming apparatus 1*e* includes an image reading unit 201 (reading unit), a coefficient calculating unit 202 (coefficient adjusting unit), a reading value storing unit 203 (storing unit), a coefficient storing unit 204, a shading compensating unit 205 (correcting unit), a light quantity adjusting unit 211 (first adjusting unit), a gain adjusting unit 212 (second adjusting unit), a part exchange detecting unit 241 (detecting unit), and an execution command unit 242 (command unit). The coefficient calculating unit 202, the reading value storing unit 203, the coefficient storing unit 204, the shading compensating unit 205, the light quantity adjusting unit 211, and the gain adjusting unit 212 are as described in the third embodiment.

The part exchange detecting unit 241 is a functional unit that detects the part replacement of the scanner 11. For example, the part exchange detecting unit 241 detects that the part replacement has been performed by, for example, an output from a sensor that detects a failure of the scanner 11 and an attachment of a lens block, a carriage 111, or the white reference plate 113. The part exchange detecting unit 241 informs the execution command unit 242 about the part replacement when detecting the part replacement. The part exchange detecting unit 241 is achieved by executing a program by, for example, the CPU 901 illustrated in FIG. 3.

The execution command unit 242 is a functional unit that outputs an execution command serving as a trigger for starting the processing of the gray balance coefficient adjustment to the image reading unit 201 when the execution command unit 103 receives a notification that the part has been replaced from the part exchange detecting unit 241. In other words, when the image reading unit 201 receives the execution command, the image forming apparatus 1*e* executes the processing of the gray balance coefficient adjustment illustrated in FIG. 13.

At least a part of the functional unit achieved by software (program) among the functional units of the image forming apparatus 1*e* illustrated in FIG. 19 may be achieved by a hardware circuit such as an FPGA or an ASIC.

The functional units of the image forming apparatus 1*e* illustrated in FIG. 19 conceptually illustrate the functions, and the functional units are not limited to the configuration in FIG. 19. For example, multiple functional units illustrated as independent functional units in the image forming apparatus 1*e* illustrated in FIG. 19 may be configured as one functional unit. On the other hand, in the image forming apparatus 1*e* illustrated in FIG. 19, the function of one functional unit may be divided into multiple functional units.

As described above, in the image forming apparatus 1e according to the sixth embodiment of the present disclosure, the part exchange detecting unit 241 detects that the part of the image reading unit 201 is replaced and the execution command unit 242 detects that the part is replaced by the part of the image reading unit 201 is allowed to read the reading value of the white reference plate (second reading value) when Accordingly, since the gray balance coefficient can be adjusted without requiring a command operation by the operator (user), the number of man-hours of the operator can be reduced and forgetting the operation of adjusting the gray balance coefficient at the time of replacing a part can be prevented.

The configuration including the scanner 11 of the image forming apparatuses 1 and 1a to 1e and the functional blocks illustrated in FIGS. 4, 8, 11, 14, 15, and 19 in the above-described embodiments corresponds to the "image reading apparatus" of the present application. The image forming apparatuses 1 and 1a to 1e in the above-described embodiments also serve as the "image reading apparatus" of the present application.

In the above-described embodiments of the present disclosure, when at least one of the functional units of the image forming apparatuses 1 and 1a to 1e is implemented by executing a program, such a program is incorporated in, for example, a ROM in advance. In the above-described embodiments of the present disclosure, the programs executed by the image forming apparatuses 1 and 1a to 1e may be provided by recording the programs in a file in an installable or executable format on a computer-readable recording medium such as a CD-ROM, a flexible disk (FD), a CD-R, or a digital versatile disc (DVD). In the above-described embodiments of the present disclosure, the programs executed by the image forming apparatuses 1 and 1a to 1e may be stored in a computer connected to a network such as the Internet, and may be downloaded through the network. In the above-described embodiments, the programs executed by the image forming apparatuses 1 and 1a to 1e may be provided or distributed via a network such as the Internet. In the above-described embodiments, the programs executed in the image forming apparatuses 1 and 1a to 1e include a module configuration including at least one of the above-described functional units, and the CPU 901 reads and executes the programs from the above-described storage device (e.g., the MEM-P 902, the MEM-C 907, and the HD 909) as actual hardware, whereby the above-described functional units are loaded onto the main storage device and generated.

Aspects of the present invention are as follows.

First Aspect

An imaging reading apparatus includes a reading unit to read a white reference plate, and a coefficient adjusting unit to adjust a gray balance coefficient based on a first reading value of the white reference plate read by the reading unit under a predetermined reading condition and a second reading value of the white reference plate read by the reading unit under an identical predetermined reading condition with the predetermined condition.

Second Aspect

The imaging reading apparatus according to the first aspect, further includes a compensating unit to compensate a reading value of an original document read by the reading unit with a shading compensation using the gray balance coefficient adjusted by the coefficient adjusting unit.

Third Aspect

The image reading apparatus according to the first or second aspect, further includes a first adjusting unit to adjust a light quantity of a light source of the reading unit, and a second adjusting unit to adjust a sensitivity of a sensor of the reading unit. The reading unit sets the light quantity adjusted by the first adjusting unit and the sensitivity adjusted by the second adjusting unit to be same with the predetermined reading condition and obtains the second reading value by reading the white reference plate.

Fourth Aspect

In the image reading apparatus according to third aspect, the first adjusting unit adjusts the light quantity of the light source in response to an operation to an operation unit, and the second adjusting unit adjusts the sensitivity of the sensor in response to an operation to the operation unit.

Fifth Aspect

In the image reading apparatus according to the third, the reading unit stores the light quantity of the light source and the sensitivity of the sensor at a time of reading the first reading value by the reading unit in a storing unit, the first adjusting unit reads the light quantity stored in the storing unit and adjusts a light quantity of the light source at a time of reading the second reading value by the reading unit to be same with the light quantity of the light source at the time of reading the first reading value, the second adjusting unit reads the sensitivity quantity stored in the storing unit and adjusts a sensitivity of the sensor at a time of reading the second reading value by the reading unit to be same with the sensitivity of the sensor at the time of reading the first reading value.

Sixth Aspect

In the image reading apparatus according to any one of the first to fifth aspects, the reading unit reads the second reading value in response to an execution operation to an operation unit.

Seventh Aspect

The image reading apparatus according to any one of the first to sixth aspects, further includes comprising a detecting unit to detect a light quantity of a surface of the white reference plate at a time of reading the first reading value by the reading unit and store the light quantity of the surface of the white reference plate in the storing unit, and adjust a light quantity of the surface of the white reference plate detected by the reading unit at a time of reading the second reading value by the reading unit to be same with the light quantity stored in the storing unit.

Eighth Aspect

The image reading apparatus according to any one of the first to seventh aspects, further includes a detecting unit to detect a replacement of a part of the reading unit, and a command unit to command the reading unit to read the second reading value.

Ninth Aspect

An image forming apparatus includes the image reading apparatus according to any one of the first to eighth aspects, and an image forming unit to form an image based on the reading value compensated with a shading compensation by the compensating unit.

Tenth Aspect

An image reading method includes reading a white reference plate by a reading unit, and adjusting a gray balance coefficient based on a first reading value of the white reference plate read by the reading unit under a predetermined reading condition and a second reading value of the white reference plate read by the reading unit under an identical predetermined reading condition with the predetermined reading condition.

Eleventh Aspect

An image reading apparatus includes a white reference plate, a reading unit to read the white reference plate, and circuitry to cause the reading unit to read the white reference plate under a first reading condition before shipment of the image reading apparatus to obtain a first reading value, and cause the reading unit to read the white reference plate under a second reading condition same with the first reading condition after replacement of a part of the image reading apparatus after the shipment to obtain a second reading value; and adjust a gray balance coefficient based on the first reading value and the second reading value.

Twelfth Aspect

In the image reading apparatus according to the eleventh aspect, the circuitry further causes the reading unit to read an original document to obtain a third reading value, performs a shading compensation on the third reading value of the original document using the gray balance coefficient adjusted by the circuitry.

Thirteenth Aspect

The image reading apparatus according to the eleventh or twelfth aspect, further includes, a light source to emit light and a sensor to detect the light. The first reading condition has a light quantity of the light source and a sensitivity of the sensor. The circuitry further adjusts a light quantity of the light source and a sensitivity of the sensor of the second reading condition to be same with the first reading condition and causes the reading unit to read the white reference plate to obtain the second reading value under the second reading condition.

Fourteenth Aspect

In the image reading apparatus according to the thirteenth aspect, the circuitry adjusts the light quantity of the light source in response to an input receipt by an operation unit and adjusts the sensitivity of the sensor in response to the input receipt by the operation unit.

Fifteenth Aspect

The image reading apparatus according to thirteenth aspect further includes a storing unit to store the light quantity of the light source and the sensitivity of the first reading value. The circuitry reads the light quantity of the first reading condition from the storing unit, adjusts a light quantity of the second reading condition to be same as the first reading condition and cause the reading unit to obtain the second reading value, reads the sensitivity of the first reading condition from the storing unit, and adjusts a sensitivity of the second reading condition to be same as the first reading condition and cause the reading nit to obtain the second reading value.

Sixteenth Aspect

In the image reading apparatus according to any one of the eleventh to fifteenth aspects, the circuitry further causes the reading unit to read the second reading value in response to the input receipt by an operation unit.

Seventeenth Aspect

In the image reading apparatus according to any one of the eleventh to sixteenth aspects, the circuitry causes the sensor to detect a light quantity of light reflected from a surface of the white reference plate, and cause the storage to store the light quantity in a storing unit as the first reading condition, and adjusts the light quantity of the light reflected from the surface of the white reference plate under the second reading condition to be same as the first reading condition, and cause the reading unit to obtain the second reading value.

Eighteenth Aspect

In the image reading apparatus according to any one of the eleventh to seventeenth aspects, the circuitry detects the replacement of the part of the image reading apparatus and causes the reading unit to obtain the second reading value in response to a detection of the replacement of the part of the image reading apparatus.

Nineteenth Aspect

An image forming apparatus includes the image reading apparatus according to any one of the eleventh to eighteenth aspects and an image forming unit to form an image based on the third reading value on which a shading compensation is performed by the circuitry.

Twentieth Aspect

An image reading method includes reading a white reference plate under a first reading condition before shipment of the image reading apparatus to obtain a first reading value, reading the white reference plate under a second reading condition same with the first reading condition after replacement of a part of the image reading apparatus after the shipment to obtain a second reading value, and adjusting a gray balance coefficient based on the first reading value and the second reading value.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image reading apparatus comprising:

a white reference plate;

a reader to read the white reference plate; and circuitry configured to:

cause the reader to read the white reference plate under a first reading condition before shipment of the image reading apparatus to obtain a first reading value;

cause the reader to read the white reference plate under a second reading condition same with the first reading condition after replacement of a part, other than the white reference plate, of the image reading apparatus after the shipment to obtain a second reading value; and adjust a gray balance coefficient based on the first reading value and the second reading value.

2. The image reading apparatus according to claim 1, wherein the circuitry is further configured to:

cause the reader to read an original document to obtain a third reading value;

perform a shading compensation on the third reading value of the original document using the gray balance coefficient adjusted by the circuitry.

3. An image forming apparatus comprising:

the image reading apparatus according to claim 2; and an image former to form an image based on the third reading value on which a shading compensation is performed by the circuitry.

4. The image reading apparatus according to claim 1, further comprising:

a light source to emit light; and a sensor to detect the light, wherein the first reading condition has:

a light quantity of the light source; and a sensitivity of the sensor, and the circuitry is further configured to:

adjust a light quantity of the light source and a sensitivity of the sensor of the second reading condition to be same with the first reading condition; and cause the reader to read the white reference plate to obtain the second reading value under the second reading condition.

5. The image reading apparatus according to claim 4, wherein the circuitry is configured to:

adjust the light quantity of the light source in response to an input receipt by an operation panel; and adjust the sensitivity of the sensor in response to the input receipt by the operation panel.

6. The image reading apparatus according to claim 5, wherein the operation panel includes at least a touch panel and hard keys.

7. The image reading apparatus according to claim 4, further comprising storage to store the light quantity of the light source and the sensitivity of the first reading value, wherein the circuitry is configured to:

read the light quantity of the first reading condition from the storage;

adjust a light quantity of the second reading condition to be same as the first reading condition and cause the reader to obtain the second reading value;

read the sensitivity of the first reading condition from the storage; and adjust a sensitivity of the second reading condition to be same as the first reading condition and cause the reader to obtain the second reading value.

8. The image reading apparatus according to claim 4, wherein the circuitry is configured to:

cause the sensor to detect a light quantity of light reflected from a surface of the white reference plate, and cause the storage to store the light quantity as the first reading condition; and adjust the light quantity of the light reflected from the surface of the white reference plate under the second reading condition to be same as the first reading condition, and cause the reader to obtain the second reading value.

9. The image reading apparatus according to claim 4, wherein the reader controls the light quantity of the light source by pulse width modulation (PWM) control.

10. The image reading apparatus according to claim 1, wherein the circuitry is further configured to cause the reader to read the second reading value in response to the input receipt by an operation panel.

11. The image reading apparatus according to claim 10, wherein the operation panel includes at least a touch panel and hard keys.

12. The image reading apparatus according to claim 1, wherein the circuitry is configured to:

detect the replacement of the part of the image reading apparatus; and cause the reader to obtain the second reading value in response to a detection of the replacement of the part of the image reading apparatus.

13. The image reading apparatus according to claim 1, wherein the first reading value stored before the shipment is an average value of white-reference-plate reading values.

14. An image reading method comprising:

reading a white reference plate under a first reading condition before shipment of the image reading apparatus to obtain a first reading value;

reading the white reference plate under a second reading condition same with the first reading condition after replacement of a part, other than the white reference plate, of the image reading apparatus after the shipment to obtain a second reading value; and adjusting a gray balance coefficient based on the first reading value and the second reading value.

* * * * *